US012671544B2

(12) United States Patent
Gao et al.

(10) Patent No.: US 12,671,544 B2
(45) Date of Patent: Jun. 30, 2026

(54) METHOD, DEVICE AND COMPUTER READABLE MEDIUM FOR COMMUNICATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 351 days.

(21) Appl. No.: 17/998,734

(22) PCT Filed: May 15, 2020

(86) PCT No.: PCT/CN2020/090657
§ 371 (c)(1),
(2) Date: Nov. 14, 2022

(87) PCT Pub. No.: WO2021/227067
PCT Pub. Date: Nov. 18, 2021

(65) Prior Publication Data
US 2023/0336304 A1     Oct. 19, 2023

(51) Int. Cl.
H04L 5/00          (2006.01)
(52) U.S. Cl.
CPC .................................. H04L 5/0051 (2013.01)
(58) Field of Classification Search
None
See application file for complete search history.

(56) References Cited
U.S. PATENT DOCUMENTS

2019/0356445 A1    11/2019  Manolakos
2022/0109474 A1 *   4/2022  Haghighat ............. H04B 7/063
(Continued)

FOREIGN PATENT DOCUMENTS

CN     109803362 A     5/2019
CN     110474727 A     11/2019
(Continued)

OTHER PUBLICATIONS

Oppo et al., "Enable gNB to configure downgrading configuration of SRS for antenna switching", 3GPP TSG RAN WG1 Meeting #98bis, RI-1910125, Oct. 20, 2019, pp. 1-6.
(Continued)

*Primary Examiner* — Luna Weissberger
(74) *Attorney, Agent, or Firm* — Sughrue Mion, PLLC

(57)          ABSTRACT

Embodiments of the present disclosure relate to methods, devices and computer readable media for communication of a RS. A method of communication comprises determining, at a network device, information indicating a first number of resources configured for communication of a RS, the first number being associated with a third number of transmit antenna ports and a fourth number of receive antenna ports of a terminal device and the fourth number being larger than a predetermined number; and transmitting the information to the terminal device. The method further comprises receiving, at the terminal device, the information; determining a second number of resources from the first number of resources, the first number being larger than or equal to the second number; and performing the communication of the RS based on the second number of resources. Embodiments of the present disclosure can achieve a RS resource configuration and a RS communication for increased antenna ports.

12 Claims, 5 Drawing Sheets

(56) References Cited

U.S. PATENT DOCUMENTS

| | | | | |
|---|---|---|---|---|
| 2022/0337373 A1* | 10/2022 | Wu | ..................... | H04L 5/0048 |
| 2022/0368405 A1* | 11/2022 | Shi | ..................... | H04B 7/0814 |
| 2023/0353297 A1* | 11/2023 | Abdelghaffar | ........ | H04L 5/0023 |

FOREIGN PATENT DOCUMENTS

| | | | |
|---|---|---|---|
| CN | 110650485 A | 1/2020 |
| CN | 111092708 A | 5/2020 |
| WO | 2019/028836 A1 | 2/2019 |

OTHER PUBLICATIONS

Samsung New WID: "Further enhancements on MIMO for NR", 3GPP TSG RAN Meeting #86, RP-193133, Nov. 12, 2019.
International Search Report for PCT/CN2020/090657 dated Feb. 18, 2021.
Written Opinion for PCT/CN2020/090657 dated Feb. 18, 2021.

\* cited by examiner

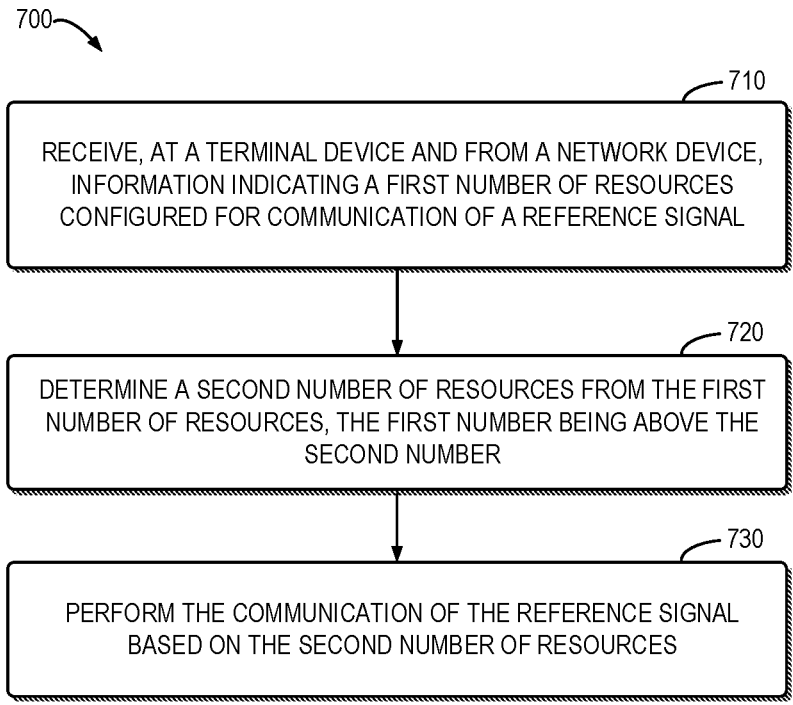

700

710

RECEIVE, AT A TERMINAL DEVICE AND FROM A NETWORK DEVICE, INFORMATION INDICATING A FIRST NUMBER OF RESOURCES CONFIGURED FOR COMMUNICATION OF A REFERENCE SIGNAL

720

DETERMINE A SECOND NUMBER OF RESOURCES FROM THE FIRST NUMBER OF RESOURCES, THE FIRST NUMBER BEING ABOVE THE SECOND NUMBER

730

PERFORM THE COMMUNICATION OF THE REFERENCE SIGNAL BASED ON THE SECOND NUMBER OF RESOURCES

DETERMINE, AT A NETWORK DEVICE, INFORMATION INDICATING A FIRST NUMBER OF RESOURCES CONFIGURED FOR COMMUNICATION OF A REFERENCE SIGNAL

820

TRANSMIT THE INFORMATION TO A TERMINAL DEVICE FOR DETERMINATION OF A SECOND NUMBER OF RESOURCES FROM THE FIRST NUMBER OF RESOURCES

METHOD, DEVICE AND COMPUTER READABLE MEDIUM FOR COMMUNICATION

TECHNICAL FIELD

Embodiments of the present disclosure generally relate to the field of telecommunication, and in particular, to methods, devices and computer storage media for communication of a reference signal (RS).

BACKGROUND

In recent study on a new radio (NR) technology, it is agreed that a sounding reference signal (SRS) antenna switching is specified for up to eight antenna ports. In this event, it has been proposed that more transmission and reception pair for antenna switching is allowed. However, no detailed solution on a resource configuration and power control is proposed, especially for aperiodic RS antenna switching.

SUMMARY

In general, embodiments of the present disclosure provide methods, devices and computer storage media for communication of a RS.

In a first aspect, there is provided a method of communication. The method comprises: receiving, at a terminal device and from a network device, information indicating a first number of resources configured for communication of a RS, the first number being associated with a third number of transmit antenna ports and a fourth number of receive antenna ports of the terminal device; determining a second number of resources from the first number of resources, the first number being larger than or equal to the second number; and performing the communication of the RS based on the second number of resources.

In a second aspect, there is provided a method of communication. The method comprises: determining, at a network device, information indicating a first number of resources configured for communication of a RS, the first number being associated with a third number of transmit antenna ports and a fourth number of receive antenna ports of a terminal device; and transmitting the information to the terminal device for determination of a second number of resources from the first number of resources, the second number of resources being used for performance of the communication and the first number being larger than the second number.

In a third aspect, there is provided a terminal device. The terminal device comprises a processor and a memory coupled to the processor. The memory stores instructions that when executed by the processor, cause the terminal device to perform the method according to the first aspect of the present disclosure.

In a fourth aspect, there is provided a network device. The network device comprises a processor and a memory coupled to the processor. The memory stores instructions that when executed by the processor, cause the network device to perform the method according to the second aspect of the present disclosure.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 7 illustrates an example method of communication implemented at a terminal device in accordance with some embodiments of the present disclosure;

Throughout the drawings, the same or similar reference numerals represent the same or similar element.

DETAILED DESCRIPTION

Figure 1:
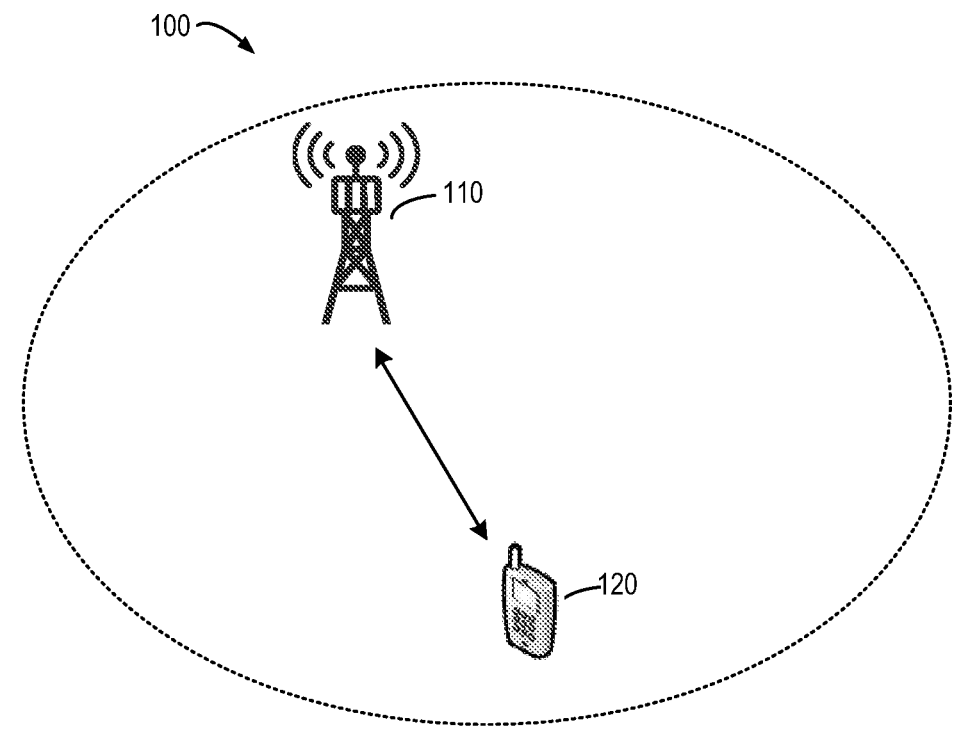
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, a first information may be transmitted to the terminal device from the first network device and a second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

Currently, a RS resource is configured by an information element (IE) and consists of N antenna ports, N=1, 2 or 4. For a RS, a terminal device splits a linear value of a transmit power on an active uplink bandwidth part of a carrier of a serving cell equally across the configured antenna ports for the RS. As more antenna ports are allowed to be configured, for example, N=6 or 8, RS antenna switching can be specified for up to eight antenna ports.

In view of the above, embodiments of the present disclosure provide an improved solution for communication of a RS, so as to solve issues related to increased antenna ports. According to embodiments of the present disclosure, a first number of resources are configured for communication of a RS and a second number of resources are determined from the first number of resources for the communication of the RS, the first number being associated with a third number of transmit antenna ports and a fourth number of receive antenna ports of a terminal device, and the first number being larger than or equal to the second number. In this way, an improved resource configuration solution can be provided for increased antenna ports. Principles and implementations of the present disclosure will be described in detail below with reference to the figures.

FIG. 1 illustrates a schematic diagram of an example communication network 100 in which embodiments of the present disclosure can be implemented. As shown in FIG. 1, the communication network 100 may include a network device 110 and a terminal device 120 served by the network device 110. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

As shown in FIG. 1, the network device 110 and the terminal device 120 may communicate with each other via downlink and uplink channels such as wireless communication downlink and uplink channels. For example, communication of a RS may be performed between the network device 110 and the terminal device 120. In some embodiments, the network device 110 may transmit a downlink RS to the terminal device 120 for at least one of channel evaluation/estimation, channel characteristic estimation and compensation, phase noise estimation, time and/or frequency tracking and associated demodulation of downlink transmission, and the terminal device 120 may correspondingly receive the downlink RS. For example, the downlink RS may be any one or more of a demodulation reference signal (DMRS), a cell reference signal (CRS), a multicast broadcast single frequency network (MBSFN) reference signal, a positioning reference signal (PRS), a fine time/frequency tracking reference signal (TRS), a phase tracking reference signal (PTRS) and a channel state information-reference signal (CSI-RS). It should be note that the reference signal may be any downlink RS existing in the art or to be developed in the future.

In some alternative embodiments, the terminal device 120 may transmit a RS (i.e., an uplink RS) to the network device 110 for at least one of channel evaluation/estimation, channel characteristic estimation and compensation, phase noise estimation, time and/or frequency tracking, channel estimation for downlink channel, and associated modulation of uplink transmission, and the network device 110 may correspondingly receive the uplink RS. For example, the RS may be any one or more of a sounding reference signal (SRS), a demodulation reference signal (DMRS), a positioning reference signal (PRS), a fine time/frequency tracking reference signal (TRS) and a phase tracking reference signal (PTRS). It should be note that the reference signal may be any uplink RS existing in the art or to be developed in the future.

The communications in the communication network 100 may conform to any suitable standards including, but not limited to, NR, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

According to embodiments of the present disclosure, a network device and a terminal device may communicate with each other based on time slots (or slots for short) as defined in the 3GPP specifications. For example, for sub-carrier spacing configuration µ, slots are numbered $$n_s^\mu \in \left\{ 0, \ldots, N_{slot}^{subframe,\mu} - 1 \right\}$$

in an increasing order within a subframe and $$n_{s,f}^\mu \in \left\{ 0, \ldots, N_{slot}^{frame,\mu} - 1 \right\}$$

in an increasing order within a frame. There are $$N_{symb}^{slot}$$

consecutive Orthogonal Frequency Division Multiplexing (OFDM) symbols in a slot where $$N_{symb}^{slot}$$

depends on the cyclic prefix as given in related 3GPP specifications (TS 38.211), as shown in Table 1 and Table 2 below. The start of slot $$n_s^\mu$$

in a subframe is aligned in time with the start of OFDM symbol $$n_s^\mu N_{symb}^{slot}$$

in the same subframe. Other related definitions and information of slots can be found in existing or future 3GPP specifications. More generally, the term slot as used herein can refer to any existing defined unit of time or any unit of time to be defined in the future.

TABLE 1

Number of OFDM symbols per slot, slots per frame, and slots per subframe for normal cyclic prefix.

| u | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 2

Number of OFDM symbols per slot, slots per frame, and slots per subframe for extended cyclic prefix.

| u | $N_{symb}^{slot}$ | $N_{slot}^{frame,\mu}$ | $N_{slot}^{subframe,\mu}$ |
|---|---|---|---|
| 2 | 12 | 40 | 4 |

According to embodiments of the present disclosure, the terminal device 120 may be configured with a guard period of Y symbols, in which the terminal device 120 does not transmit any other signal, in the case the RS resources of a set are transmitted in the same slot. The guard period is in-between the RS resources of the set. The value of Y may be defined by Table 3. The correspondences in Table 3 are merely for illustration. In some alternative embodiments, only part of the correspondences between SCS and Y in Table 3 may be defined. For example, any one or more values of SCS from {240 kHz, 480 kHz, 960 kHz, 1920 kHz, 3840 kHz} and the corresponding value of Y in Table 3 may be defined. It should be noted that any other suitable definitions are also feasible.

TABLE 3

The minimum guard period between two RS resources of a RS resource set for antenna switching

| SCS (kHz) | Y [symbol] |
|---|---|
| 15 | 1 |
| 30 | 1 |
| 60 | 1 |
| 120 | 2 |
| 240 | 4 |
| 480 | 7 |
| 960 | 14 or 1 slot |
| 1920 | 27 or 1 slot or 2 slots |
| 3840 | 54 or 3 slots or 4 slots |

As more antenna ports are allowed to be configured, e.g., the terminal device 120 is configured with x transmit antenna ports and y receive antenna ports, denoted as xTyR, x ∈ {1, 2, 4} and y ∈ {6, 8}, RS antenna switching can be specified for up to eight antenna ports. In view of this, embodiments of the present disclosure provide an improved solution for communication of a RS. According to embodiments of the present disclosure, a first number of resources are configured for communication of a RS and a second number of resources are determined from the first number of resources for the communication of the RS, the first number being associated with a third number of transmit antenna ports and a fourth number of receive antenna ports of a terminal device, and the first number being larger than or equal to the second number. In this way, an improved resource configuration solution can be provided for increased antenna ports. It will be described with reference to FIG. 2.

Figure 2:
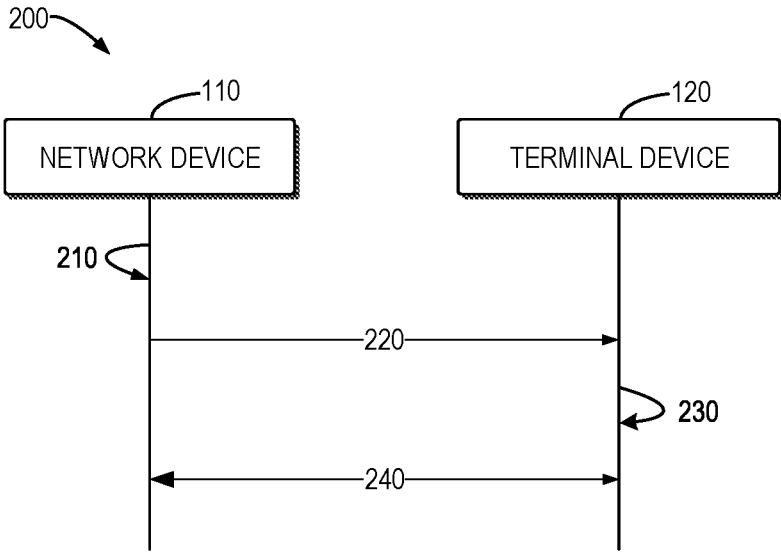
FIG. 2 illustrates a schematic diagram illustrating a process for communication of a RS according to embodiments of the present disclosure.

FIG. 2 shows a schematic diagram illustrating a process 200 for communication of a RS according to embodiments of the present disclosure. For the purpose of discussion, the process 200 will be described with reference to FIG. 1. The process 200 may involve the network device 110 and the terminal device 120 as illustrated in FIG. 1.

As shown in FIG. 2, the network device 110 may determine 210 information indicating a first number of resources configured for communication of a RS. As discussed above, the RS may be any downlink or uplink reference signal existing in the art or to be developed in the future. For the purpose of discussion, the following description will be made by taking a SRS as an example of the RS.

In some embodiments, the first number is associated with a third number (e.g., x) of transmit antenna ports and a fourth number (e.g., y) of receive antenna ports of the terminal device 120. In some embodiments, the fourth number is larger than a predetermined number. In some embodiments, the predetermined number may be larger than or equal to four. In some embodiments, the predetermined number may be a number larger than four and no larger than eight. It should be noted that the predetermined number may be any other suitable number. The details will be described in connection with Embodiments 1-4.

Embodiment 1

In this embodiment, the third number is four and the fourth number is six, i.e., the terminal device 120 is configured with 4T6R. In this case, 6 receiving ports for DL CSI are needed to be measured, while up to 4 ports is supported, so two resources are needed for antenna switching, and how many SRS ports within one resource need to be designed. The details will be given below in connection with Examples 1-3.

Example 1

In this example, the first number of resources may comprise first and second resources for antenna switching, and each of the first and second resources consists of four ports. In some embodiments, the four ports in the first resource are associated with four antenna ports of the terminal device 120, and the four ports in the second resource are associated with four antenna ports of the terminal device 120. And two ports in the first resource and two ports in the second resource are associated with same two antenna ports of the terminal device. For example, in the second resource, there will be two antenna ports of the terminal device 120 which has RS communication in the first resource. It will be described with reference to FIG. 3.

Figure 3:
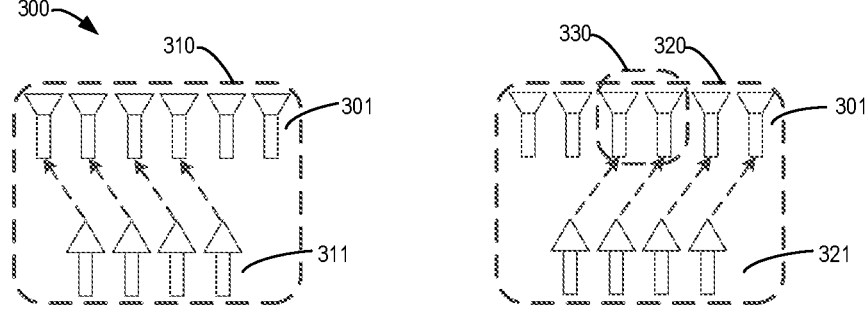
FIG. 3 illustrates a schematic diagram illustrating a port configuration according to some embodiments of the present disclosure.

FIG. 3 illustrates a schematic diagram 300 illustrating a port configuration according to some embodiments of the present disclosure. As shown in FIG. 3, reference sign 310 denotes a first resource, reference sign 320 denotes a second resource, reference sign 311 denotes four ports of the first resource, reference sign 321 denotes four ports of the second resource, and reference sign 301 denotes six antenna ports of the terminal device 120.

In some embodiments, four ports 311 are associated with four antenna ports of the terminal device 120 respectively, as shown by the dotted arrows in the first resource 310. Four ports 321 are associated with four antenna ports of the terminal device 120 respectively, as shown by the dotted arrows in the second resource 320. In some embodiments, two ports in the first resource and two ports in the second resource are associated with same two antenna ports of the terminal device. For example, in this case, in addition to two ports of the first resource 320, two antenna ports of the terminal device 120 as denoted by reference sign 330 are also associated with two ports of the first resource 310.

In some embodiments, which two ports in the second resource are used for the two antenna ports may be predetermined or configured by the network device. For example, ports 0, 1 or ports 1000, 1001 in the second resource may be used for the two antenna ports. As another example, ports 2, 3 or ports 1002, 1003 in the second resource may be used for the two antenna ports. As another example, ports 0, 2 or ports 1000, 1002 in the second resource may be used for the two antenna ports. As another example, ports 1, 3 or ports 1001, 1003 in the second resource may be used for the two antenna ports. It should be noted that any two of ports 0, 1, 2, 3 or any two of ports 1000, 1001, 1002, 1003 in the second resource are feasible. In some embodiments, the terminal device 120 may select two of the six antenna ports to be two main antennas or two polarized antennas.

For example, SRS is taken as an example of the RS. For 4T6R, up to two SRS resource sets configured with a different value for the higher layer parameter resourceType in SRS-ResourceSet set, where each SRS resource set has two SRS resources transmitted in different symbols, each SRS resource in a given set consisting of four SRS ports, and SRS ports 2, 3 (or 1, 3 or 1002, 1003 or 1001, 1003) of the second resource are associated with different UE antenna ports than the SRS ports of the first resource (or SRS ports 0, 1 (or 0, 2 or 1000, 1002 or 1000, 1001) of the second resource are associated with same UE antenna ports with two SRS ports of the first resource).

In some embodiments, two SRS resources may be configured for 4T6R, and the two SRS resources are transmitted in different symbols, each SRS resource consisting of four SRS ports, and two SRS ports of the second resource (For example, the two SRS ports may be any one of ports (2, 3), ports (1, 3), ports (0, 1), ports (0, 2), ports (0, 3), ports (1, 2), ports (1002, 1003), ports (1001, 1003), ports (1000, 1001), ports (1000, 1002), ports (1000, 1003), ports (1001, 1002).) are associated with different UE antenna ports than any one of the SRS four ports of the first resource (For example, the four SRS ports may be any one of ports (0, 1, 2, 3) or ports (1000, 1001, 1002, 1003).). In some embodiments, two SRS resources may be configured for 4T6R, and the two SRS resources are transmitted in different symbols, each SRS resource consisting of four SRS ports, and two SRS ports of the first resource (For example, the two SRS ports may be any one of ports (2, 3), ports (1, 3), ports (0, 1), ports (0, 2), ports (0, 3), ports (1, 2), ports (1002, 1003), ports (1001, 1003), ports (1000, 1001), ports (1000, 1002), ports (1000, 1003), ports (1001, 1002).) are associated with different UE antenna ports than any one of the four SRS ports of the second resource (For example, the four SRS ports may be any one of ports (0, 1, 2, 3) or ports (1000, 1001, 1002, 1003).).

In some embodiments, two SRS resources may be configured for 4T6R, and the two SRS resources are transmitted in different symbols, each SRS resource consisting of four SRS ports, and two SRS ports of the second resource (For example, the two SRS ports may be any one of ports (2, 3), ports (1, 3), ports (0, 1), ports (0, 2), ports (0, 3), ports (1, 2), ports (1002, 1003), ports (1001, 1003), ports (1000, 1001), ports (1000, 1002), ports (1000, 1003), ports (1001, 1002).) are associated with same UE antenna ports with two SRS ports of the first resource (For example, the two SRS ports may be any one of ports (2, 3), ports (1, 3), ports (0, 1), ports (0, 2), ports (0, 3), ports (1, 2), ports (1002, 1003), ports (1001, 1003), ports (1000, 1001), ports (1000, 1002), ports (1000, 1003), ports (1001, 1002).).

In some embodiments, the two SRS resources may be in one SRS resource set. For example, the SRS resource set may be configured with a time domain behavior by the higher layer parameter resourceType in SRS-ResourceSet. For example, the time domain behavior may be at least one of aperiodic, periodic and semi-persistent.

According to embodiments of the present disclosure, the two antenna ports 330 in the second resource 320 can be used to estimate and compensate some channel characteristic, e.g., phase noise, doppler effect, and so on. In addition, power allocation for four ports in the first and second resources are equal, and no power changing in symbols for the first and second resources in the slot.

Example 2

In this example, the first number of resources may comprise first and second resources for antenna switching, each of the first and second resources consists of four ports, but only three ports in each of the first and second resources are used for RS communication. In some embodiments, the three ports in the first resource are associated with three antenna ports of the terminal device 120, and the three ports in the second resource are associated with three different antenna ports of the terminal device 120. For example, each of the three ports in the first resource are associated with a different antenna port of the terminal device than any one of the three ports in the second resource. For another example, each of the three ports in the second resource are associated with a different antenna port of the terminal device than any one of the three ports in the first resource. For example, in this case, the three ports in each of the first and second resources are associated with different six antenna ports of the terminal device 120, respectively.

In some embodiments, which three ports in each of the first and second resources are selected for RS communication may be predetermined or configured. For example, ports 0, 1, 2 or port 1000, 1001, 1002 in each of the first and second resources may be used for RS communication. As another example, ports 0, 1, 2 or ports 1000, 1001, 1002 in the first resource and ports 1, 2, 3 or ports 1001, 1002, 1003 in the second resource may be used for RS communication. It should be noted that any three of ports 0, 1, 2, 3 or ports 1000, 1001, 1002, 1003 in each of the first and second resources are feasible.

For example, SRS is taken as an example of the RS. For 4T6R, up to two SRS resource sets configured with a different value for the higher layer parameter resourceType in SRS-ResourceSet set, where each SRS resource set has two SRS resources transmitted in different symbols, each SRS resource in a given set consisting of four SRS ports, and three SRS ports (e.g. SRS ports 0, 1, 2 or SRS ports 1000, 1001, 1002) in each SRS resource in a given set will be transmitted, and the transmitted three SRS ports in the second resource are associated with different UE antenna ports than the three transmitted SRS ports of the first resource.

In some embodiments, two SRS resources may be configured for 4T6R, and the two SRS resources are transmitted in different symbols, each SRS resource consisting of four SRS ports, and three SRS ports in each SRS resource will be transmitted, and the transmitted three SRS ports of the second resource (For example, the three SRS ports may be any one of ports (0, 1, 2), ports (1, 2, 3), ports (0, 1, 3), ports (0, 2, 3), ports (1000, 1001, 1002), ports (1001, 1002, 1003), ports (1000, 1001, 1003), ports (1000, 1002, 1003).) are associated with different UE antenna ports than any one of the SRS ports of the first resource. In some embodiments, two SRS resources may be configured for 4T6R, and the two SRS resources are transmitted in different symbols, each SRS resource consisting of four SRS ports, and three SRS ports in each SRS resource will be transmitted, and the transmitted three SRS ports of the first resource (For example, the three SRS ports may be any one of ports (0, 1, 2), ports (1, 2, 3), ports (0, 1, 3), ports (0, 2, 3), ports (1000, 1001, 1002), ports (1001, 1002, 1003), ports (1000, 1001, 1003), ports (1000, 1002, 1003).) are associated with different UE antenna ports than any one of the SRS ports of the second resource.

In some embodiments, the first number of resources may comprise first and second resources for antenna switching, each of the first and second resources consists of three ports. In some embodiments, the three ports in the first resource are associated with three antenna ports of the terminal device 120, and the three ports in the second resource are associated with three different antenna ports of the terminal device 120. For example, each of the three ports in the first resource are associated with a different antenna port of the terminal device than any one of the three ports in the second resource. For another example, each of the three ports in the second resource are associated with a different antenna port of the terminal device than any one of the three ports in the first resource. For example, in this case, the three ports in each of the first and second resources are associated with different six antenna ports of the terminal device 120, respectively. In some embodiments, ports 0, 1, 2 or port 1000, 1001, 1002 in each of the first and second resources may be used for RS communication.

For example, SRS is taken as an example of the RS. For 4T6R, up to two SRS resource sets configured with a different value for the higher layer parameter resourceType in SRS-ResourceSet set, where each SRS resource set has two SRS resources transmitted in different symbols, each SRS resource in a given set consisting of three SRS ports (e.g. SRS ports 0, 1, 2 or SRS ports 1000, 1001, 1002), and the three SRS ports in the second resource are associated with different UE antenna ports than the three SRS ports of the first resource.

In some embodiments, two SRS resources may be configured for 4T6R, and the two SRS resources are transmitted in different symbols, each SRS resource consisting of three SRS ports, and the three SRS ports of the second resource (For example, the three SRS ports may be any one of ports (0, 1, 2), ports (1000, 1001, 1002).) are associated with different UE antenna ports than any one of the three SRS ports of the first resource (For example, the three SRS ports may be any one of ports (0, 1, 2), ports (1000, 1001, 1002).).

In some embodiments, two SRS resources may be configured for 4T6R, and the two SRS resources are transmitted in different symbols, each SRS resource consisting of three SRS ports, and the three SRS ports of the first resource (For example, the three SRS ports may be any one of ports (0, 1, 2), ports (1000, 1001, 1002).) are associated with different UE antenna ports than any one of the three SRS ports of the second resource (For example, the three SRS ports may be any one of ports (0, 1, 2), ports (1000, 1001, 1002).).

In some embodiments, the two SRS resources may be in one SRS resource set. For example, the SRS resource set may be configured with a time domain behavior by the higher layer parameter resourceType in SRS-ResourceSet. For example, the time domain behavior may be at least one of aperiodic, periodic and semi-persistent.

In some embodiments, for the SRS transmission, the terminal device may split a linear value of the transmit power equally across the transmitted antenna ports for SRS (in a SRS resource).

In some embodiments, two SRS resources may be configured for 4T6R, and the two SRS resources are transmitted in different symbols, each SRS resource consisting of four SRS ports, and three SRS ports in each SRS resource will be transmitted. And for the SRS transmission, the terminal device may split a linear value of the transmit power equally across the three transmitted antenna ports for SRS.

In some embodiments, for SRS, the terminal device 120 splits a linear value $\hat{P}_{SRSb,f,c}(i,q_s,l)$ of the transmit power $P_{SRSb,f,c}(i,q_s,l)$ on active UL BWP b of carrier f of serving cell c equally across the transmitted antenna ports for SRS (in a SRS resource). For example, if the terminal device 120 is configured with the higher layer parameter usage in SRS-ResourceSet set as 'antennaSwitching', the terminal device 120 is configured with 't4r6' for 4T6R.

In some embodiments, for SRS, the terminal device 120 splits a linear value $\hat{P}_{SRSb,f,c}(i,q_s,l)$ of the transmit power $P_{SRSb,f,c}(i,q_s,l)$ on active UL BWP b of carrier f of serving cell c equally across the transmitted antenna ports for SRS (in a SRS resource), if the terminal device 120 is configured with the higher layer parameter usage in SRS-ResourceSet set as 'antennaSwitching', the terminal device 120 is configured with 't4r6' for 4T6R, otherwise the terminal device 120 splits a linear value $\hat{P}_{SRSb,f,c}(i,q_s,l)$ of the transmit power $P_{SRSb,f,c}(i,q_s,l)$ on active UL BWP b of carrier f of serving cell c equally across the configured antenna ports for SRS (in a SRS resource).

According to embodiments of the present disclosure, power allocation for the three ports in each of the first and second resources are equal, and no power changing in symbols in a given slot. In this case, the power can be higher than that allocated among four ports in one resource, and thus it is better for channel estimation.

Example 3

In some embodiments, the first number of resources may comprise first and second resources for antenna switching, the first resource consists of four ports and the second resource consists of two ports, or the first resource consists of two ports and the second resource consists of four ports. In some embodiments, the four ports in the first resource are associated with four antenna ports of the terminal device 120, and the two ports in the second resource are associated with two antenna ports of the terminal device 120. For example, each of the four ports in the first resource are associated with a different antenna ports of the terminal device than any one of the two ports in the second resource. For another example, each of the two ports in the second resource are associated with a different antenna ports of the terminal device than any one of the four ports in the first resource.

In some embodiments, the two ports in the first resource are associated with two antenna ports of the terminal device 120, and the four ports in the second resource are associated with four antenna ports of the terminal device 120. For example, each of the two ports in the first resource are associated with a different antenna port of the terminal device than any one of the four ports in the second resource. For another example, each of the four ports in the second resource are associated with a different antenna port of the terminal device than any one of the two ports in the first resource. For example, in this case, the four ports of the first resource and the two ports of the second resource are associated with different six antenna ports of the terminal device 120, respectively. For another example, in this case, the two ports of the first resource and the four ports of the second resource are associated with different six antenna ports of the terminal device 120, respectively.

For example, SRS is taken as an example of the RS. For 4T6R, up to two SRS resource sets configured with a different value for the higher layer parameter resourceType in SRS-ResourceSet set, where each SRS resource set has two SRS resources transmitted in different symbols, in a given set, one SRS resource consisting of four SRS ports, and the other SRS resource consisting of two SRS ports, and the two or four SRS ports in the second resource are associated with different UE antenna ports than the four or two SRS ports of the first resource.

In some embodiments, two SRS resources may be configured for 4T6R, and the two SRS resources are transmitted in different symbols, and the first SRS resource consisting of four SRS ports, and the second SRS resource consisting of two SRS ports, and the two SRS ports of the second resource (For example, the two SRS ports may be any one of ports (2, 3), ports (1, 3), ports (0, 1), ports (0, 2), ports (0, 3), ports (1, 2), ports (1002, 1003), ports (1001, 1003), ports (1000, 1001), ports (1000, 1002), ports (1000, 1003), ports (1001, 1002).) are associated with different UE antenna ports than any one of the four SRS ports (For example, the four SRS ports may be any one of ports (0, 1, 2, 3) or ports (1000, 1001, 1002, 1003).) of the first resource.

In some embodiments, two SRS resources may be configured for 4T6R, and the two SRS resources are transmitted in different symbols, and the first SRS resource consisting of two SRS ports, and the second SRS resource consisting of four SRS ports, and the two SRS ports of the first resource (For example, the two SRS ports may be any one of ports (2, 3), ports (1, 3), ports (0, 1), ports (0, 2), ports (0, 3), ports (1, 2), ports (1002, 1003), ports (1001, 1003), ports (1000, 1001), ports (1000, 1002), ports (1000, 1003), ports (1001, 1002).) are associated with different UE antenna ports than any one of the four SRS ports (For example, the four SRS ports may be any one of ports (0, 1, 2, 3) or ports (1000, 1001, 1002, 1003).) of the second resource.

In some embodiments, the two SRS resources may be in one SRS resource set. For example, the SRS resource set may be configured with a time domain behavior by the higher layer parameter resourceType in SRS-ResourceSet. For example, the time domain behavior may be at least one of aperiodic, periodic and semi-persistent.

In some alternative embodiments, the first number of resources may comprise first and second resources for antenna switching, each of the first and second resources consists of four ports, but for one of the first and second resources, only two ports are used for RS communication. For example, four ports are used for RS communication in the other resource. In some embodiments, the two ports are predetermined or configured by network device. In some embodiments, four ports are used for RS communication in the first resource, and the four ports (For example, the four ports may be any one of ports (0, 1, 2, 3), ports (1000, 1001, 1002, 1003).) in the first resource are associated with four antenna ports of the terminal device 120, and two ports are used for RS communication in the second resource, and the two ports (For example, the two ports may be any one of ports (2, 3), ports (1, 3), ports (0, 1), ports (0, 2), ports (0, 3), ports (1, 2), ports (1002, 1003), ports (1001, 1003), ports (1000, 1001), ports (1000, 1002), ports (1000, 1003), ports (1001, 1002).) in the second resource are associated with two different antenna ports of the terminal device 120. For example, each of the four ports in the first resource are associated with a different antenna port of the terminal device than any one of the two ports in the second resource. For another example, each of the two ports in the second resource are associated with a different antenna port of the terminal device than any one of the four ports in the first resource.

In some embodiments, two ports are used for RS communication in the first resource, and the two ports (For example, the two ports may be any one of ports (2, 3), ports (1, 3), ports (0, 1), ports (0, 2), ports (0, 3), ports (1, 2), ports (1002, 1003), ports (1001, 1003), ports (1000, 1001), ports (1000, 1002), ports (1000, 1003), ports (1001, 1002).) in the first resource are associated with two antenna ports of the terminal device 120, and four ports are used for RS communication in the second resource, and the four ports (For example, the four ports may be any one of ports (0, 1, 2, 3), ports (1000, 1001, 1002, 1003).) in the second resource are associated with four different antenna ports of the terminal device 120. For example, each of the two ports in the first resource are associated with a different antenna port of the terminal device than any one of the four ports in the second resource. For another example, each of the four ports in the second resource are associated with a different antenna port of the terminal device than any one of the two ports in the first resource. For example, in this case, the four ports of one of the first and second resources and the two ports of the other resource are associated with different six antenna ports of the terminal device 120, respectively.

For example, SRS is taken as an example of the RS. For 4T6R, up to two SRS resource sets configured with a different value for the higher layer parameter resourceType in SRS-ResourceSet set, where each SRS resource set has two SRS resources transmitted in different symbols, each SRS resource in a given set consisting of four SRS ports, in a given set, four SRS ports in one SRS resource are transmitted, and two SRS ports (e.g. SRS ports 0, 1 or 0, 2 or 1000, 1001 or 1000, 1002) in the other SRS resource are transmitted, and the transmitted two or four SRS ports in the second resource is associated with different UE antenna ports than the four or two SRS ports of the first resource.

In some embodiments, two SRS resources may be configured for 4T6R, and the two SRS resources are transmitted in different symbols, and each of the first and second SRS resource consisting of four SRS ports, for the first SRS resource, two ports out of the four configured SRS ports are used for SRS transmission, and for the second SRS resource, four ports are used for SRS transmission. The two (transmitted) SRS ports (For example, the two SRS ports may be any one of ports (2, 3), ports (1, 3), ports (0, 1), ports (0, 2), ports (0, 3), ports (1, 2), ports (1002, 1003), ports (1001, 1003), ports (1000, 1001), ports (1000, 1002), ports (1000, 1003), ports (1001, 1002).) of the first resource are associated with different UE antenna ports than any one of the four SRS ports (For example, the four SRS ports may be any one of ports (0, 1, 2, 3) or ports (1000, 1001, 1002, 1003).) of the second resource.

In some embodiments, two SRS resources may be configured for 4T6R, and the two SRS resources are transmitted in different symbols, and each of the first and second SRS resource consisting of four SRS ports, for the second SRS resource, two ports out of the four configured SRS ports are used for SRS transmission, and for the first SRS resource, four ports are used for SRS transmission. The two (transmitted) SRS ports (For example, the two SRS ports may be any one of ports (2, 3), ports (1, 3), ports (0, 1), ports (0, 2), ports (0, 3), ports (1, 2), ports (1002, 1003), ports (1001, 1003), ports (1000, 1001), ports (1000, 1002), ports (1000, 1003), ports (1001, 1002).) of the second resource are associated with different UE antenna ports than any one of the four SRS ports (For example, the four SRS ports may be any one of ports (0, 1, 2, 3) or ports (1000, 1001, 1002, 1003).) of the first resource.

In some embodiments, the two SRS resources may be in one SRS resource set. For example, the SRS resource set may be configured with a time domain behavior by the higher layer parameter resourceType in SRS-ResourceSet. For example, the time domain behavior may be at least one of aperiodic, periodic and semi-persistent.

In some embodiments, power for each port in one of the first and second resources are same and is based on the power for a RS resource with four ports. In this way, power allocation for ports are equal, and no power changing for the symbols in a given slot. Meanwhile, power is wasted for the resource with only two ports for RS communication.

In some embodiments, for the SRS transmission, the terminal device may split a linear value of the transmit power equally across the configured antenna ports for SRS (in a SRS resource).

In some embodiments, for the SRS transmission, the terminal device may split a linear value of the transmit power equally across the maximum number of configured antenna ports for SRS across the SRS resources (in a SRS resource set).

In some embodiments, two SRS resources may be configured for 4T6R, and the two SRS resources are transmitted in different symbols, and the first SRS resource consisting of four SRS ports, and the second SRS resource consisting of two SRS ports.

In some embodiments, two SRS resources may be configured for 4T6R, and the two SRS resources are transmitted in different symbols, and the first SRS resource consisting of two SRS ports, and the second SRS resource consisting of four SRS ports.

In some embodiments, for the SRS transmission in both of the two SRS resources, the terminal device may split a linear value of the transmit power equally across the configured antenna ports for SRS in the first SRS resource.

In some embodiments, for the SRS transmission in both of the two SRS resources, the terminal device may split a linear value of the transmit power equally across the configured antenna ports for SRS in the second SRS resource.

In some embodiments, for the SRS transmission, the terminal device may split a linear value of the transmit power equally across the maximum number of configured antenna ports for SRS between the first and second SRS resources.

In some embodiments, for the SRS transmission in both of the two SRS resources, the terminal device may split a linear value of the transmit power equally across four antenna ports for SRS (in the first or second SRS resource).

In some embodiments, for SRS, the terminal device 120 splits a linear value $\dot{P}_{SRSb,f,c}(i,q_s,l)$ of the transmit power $P_{SRSb,f,c}(i,q_s,l)$ on active UL BWP b of carrier f of serving cell c equally across the maximum number of configured antenna ports for SRS between the first SRS resource and second SRS resource, or equally across the (four) configured antenna ports for SRS (in the first or second SRS resource). For example, if the terminal device 120 is configured with the higher layer parameter usage in SRS-ResourceSet set as 'antennaSwitching', the UE is configured with 't4r6' for 4T6R, the power for SRS transmission is according to the embodiments for both the two SRS resources.

In some embodiments, for the SRS in the first SRS resource and second SRS resource, the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the maximum number of configured antenna ports for SRS between the first SRS resource and second SRS resource, or equally across the (four) configured antenna ports for SRS (in the first or second SRS resource), if the terminal device 120 is configured with the higher layer parameter usage in SRS-ResourceSet set as 'antennaSwitching', the terminal device 120 is configured with 't4r6' for 4T6R, otherwise the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the configured antenna ports for SRS (in a SRS resource).

In some alternative embodiments, power for each port in one of the first and second resources is based on the number of ports for RS communication in each resource. In this case, the network device 110 may need to adjust the power when receiving the RS. For example, the network device 110 may adjust the power with −3 dB for the resource with two ports for RS communication. As another example, the terminal device 120 may select two main antenna ports or two polarized antenna ports for RS communication in the resource with two ports. In this way, power is not wasted, but power allocation for ports are unequal, and there is power changing for the symbols in a given slot.

In some embodiments, for the SRS transmission, the terminal device may split a linear value of the transmit power equally across the configured antenna ports for SRS (in a SRS resource).

In some embodiments, two SRS resources may be configured for 4T6R, and the two SRS resources are transmitted in different symbols, and the first SRS resource consisting of four SRS ports, and the second SRS resource consisting of two SRS ports. In some embodiments, for the SRS transmission in the first SRS resource, the terminal device may split a linear value of the transmit power equally across the configured (four) antenna ports for SRS. In some embodiments, for the SRS transmission in the second SRS resource, the terminal device may split a linear value of the transmit power equally across the configured (two) antenna ports for SRS.

In some embodiments, two SRS resources may be configured for 4T6R, and the two SRS resources are transmitted in different symbols, and the first SRS resource consisting of two SRS ports, and the second SRS resource consisting of four SRS ports. In some embodiments, for the SRS transmission in the first SRS resource, the terminal device may split a linear value of the transmit power equally across the configured (two) antenna ports for SRS. In some embodiments, for the SRS transmission in the second SRS resource, the terminal device may split a linear value of the transmit power equally across the configured (four) antenna ports for SRS.

In some embodiments, for SRS, the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the configured (four) antenna ports for SRS in the first SRS resource, and equally across the configured (two) antenna ports for SRS (in the second SRS resource). In some embodiments, for SRS, the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the configured (two) antenna ports for SRS in the first SRS resource, and equally across the configured (four) antenna ports for SRS (in the second SRS resource). For example, if the terminal device 120 is configured with the higher layer parameter usage in SRS-ResourceSet set as 'antennaSwitching', the terminal device 120 is configured with 't4r6' for 4T6R, the power for SRS transmission is according to the embodiments for both the two SRS resources.

In some embodiments, for SRS, the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the configured (four) antenna ports for SRS in the first SRS resource, and equally across the configured (two) antenna ports for SRS (in the second SRS resource), if the terminal device 120 is configured with the higher layer parameter usage in SRS-ResourceSet set as 'antennaSwitching', the terminal device 120 is configured with 't4r6' for 4T6R, otherwise the terminal device 120 or the terminal device splits a linear value $\hat{P}_{SRSb,f,c}(i,q_s,I)$ of the transmit power $P_{SRSb,f,c}(i,q_s,I)$ on active UL BWP b of carrier f of serving cell c equally across the configured antenna ports for SRS (in a SRS resource).

In some embodiments, for SRS, the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the configured (two) antenna ports for SRS in the first SRS resource, and equally across the configured (four) antenna ports for SRS (in the second SRS resource), if the terminal device 120 or the terminal device is configured with the higher layer parameter usage in SRS-ResourceSet set as 'antennaSwitching', the terminal device 120 is configured with 't4r6' for 4T6R, otherwise the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the configured antenna ports for SRS (in a SRS resource).

In some embodiments, for the SRS transmission, the terminal device may split a linear value of the transmit power equally across the transmitted antenna ports for SRS (in a SRS resource).

In some embodiments, two SRS resources may be configured for 4T6R, and the two SRS resources are transmitted in different symbols, each SRS resource consisting of four SRS ports, and for the first SRS resource, two ports out of the four configured SRS ports are used for SRS transmission, and for the second SRS resource, four ports are used for SRS transmission. In some embodiments, for SRS, the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the transmitted antenna ports for SRS (in the first or second SRS resource). For example, if the terminal device 120 is configured with the higher layer parameter usage in SRS-ResourceSet set as 'antennaSwitching', the terminal device 120 is configured with 't4r6' for 4T6R. For example, for the SRS in the first SRS resource, the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the two transmitted antenna ports for SRS. For another example, for the SRS in the first or second SRS resource, the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the four configured or transmitted antenna ports for SRS.

In some embodiments, two SRS resources may be configured for 4T6R, and the two SRS resources are transmitted in different symbols, and each of the first and second SRS resource consisting of four SRS ports, for the second SRS resource, two ports out of the four configured SRS ports are used for SRS transmission, and for the first SRS resource, four ports are used for SRS transmission. In some embodiments, for SRS, the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the transmitted antenna ports for SRS (in the first or second SRS resource). For example, if the terminal device 120 is configured with the higher layer parameter usage in SRS-ResourceSet set as 'antennaSwitching', the terminal device 120 is configured with 't4r6' for 4T6R. For example, for the SRS in the second SRS resource, the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the two transmitted antenna ports for SRS. For another example, for the SRS in the first or second SRS resource, the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the four configured or transmitted antenna ports for SRS.

In some embodiments, for SRS, the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the two transmitted antenna ports for SRS (in the first or second SRS resource), if the terminal device 120 is configured with the higher layer parameter usage in SRS-ResourceSet set as 'antennaSwitching', the terminal device 120 is configured with 't4r6' for 4T6R, otherwise the terminal device 120 splits a linear value $\hat{P}_{SRSb,f,c}(i,q_s,I)$ of the transmit power $P_{SRSb,f,c}(i,q_s,I)$ on active UL BWP b of carrier f of serving cell c equally across the configured antenna ports for SRS (in a SRS resource).

Embodiment 2

In this embodiment, the third number is one and the fourth number is eight, i.e., the terminal device 120 is configured with 1T8R.

In some embodiments, for periodic or semi-persistent RS, the periodicity for RS resource should be no less than the total number of slots for once antenna switching. For example, one RS resource set configured, and eight RS resources within the RS resource set, the periodicity for each RS resource should be same, and the periodicity should be larger than 2 (or the periodicity should be configured to be 4 or larger). For example, the slot offset for some of the RS resources may be different.

In some embodiments, for aperiodic RS, at least eight RS resources are needed, each RS resource consists of one port, and at least three resource sets are configured, each resource set includes up to three resources and each resource consists of one port. The details will be given below in connection with Examples 4-9.

Example 4

In this example, the first number of resources may comprise three resource sets, two of the three resource sets each comprises three resources and the other one of the three resource sets comprises two resources, and each resource consists of one port.

Example 5

In this example, the first number of resources may comprise three resource sets, each of the three resource sets comprises three resources, and each resource consists of one port.

In some embodiments, if all three resources in each resource set can be transmitted (e.g. not dropped or not overlapped with other channels/signals (e.g. PDCCH, PDSCH, PUSCH, PUCCH, SRS) or the number of uplink symbols is enough, first or last two resources will be transmitted in the slot for the last/third resource set or alternatively, the first or the last or the third resource will not be transmitted in the slot for the last/third resource set. Otherwise, two resources will be transmitted in the slot for one resource set if only two resources can be transmitted (e.g. the number of uplink symbols in the slot is not enough (e.g. less than six), or overlapped with other channels/signals (e.g. PDCCH, PDSCH, PUSCH, PUCCH, SRS), or one or more resources are dropped). It will be described below with reference to FIGS. 4-6 by taking SRS as an example of the RS.

Figure 4:
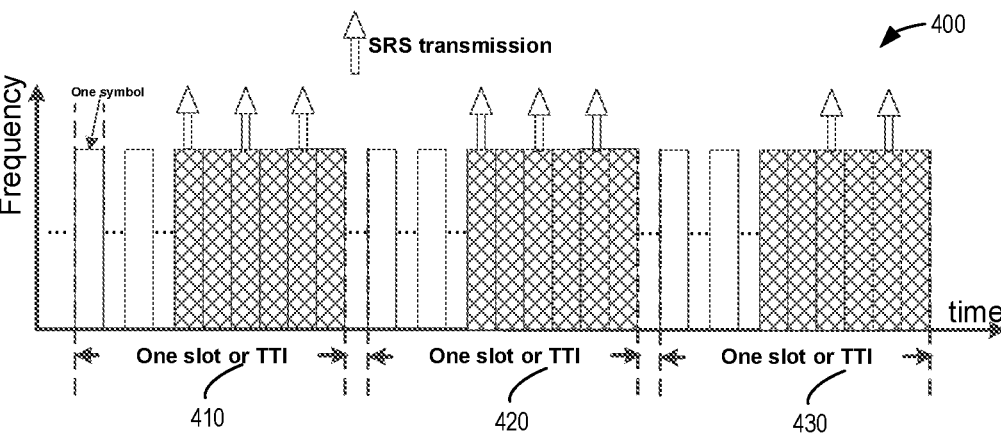
FIG. 4 illustrates a schematic time-frequency diagram illustrating an example of a SRS resource configuration and a SRS transmission according to some embodiments of the present disclosure.

FIG. 4 illustrates a schematic time-frequency diagram 400 illustrating an example of a SRS resource configuration and a SRS transmission according to some embodiments of the present disclosure. Reference sign 410 denotes first resource set in a first slot, reference sign 420 denotes second resource set in a second slot, and reference sign 430 denotes third resource set in a third slot. Each of the resource sets 410, 420 and 430 has three resources. In some embodiments where all three resources in each resource set can be transmitted, the last two resources will be transmitted in the third slot for the third resource set 430, as shown in FIG. 4.

Figure 5:
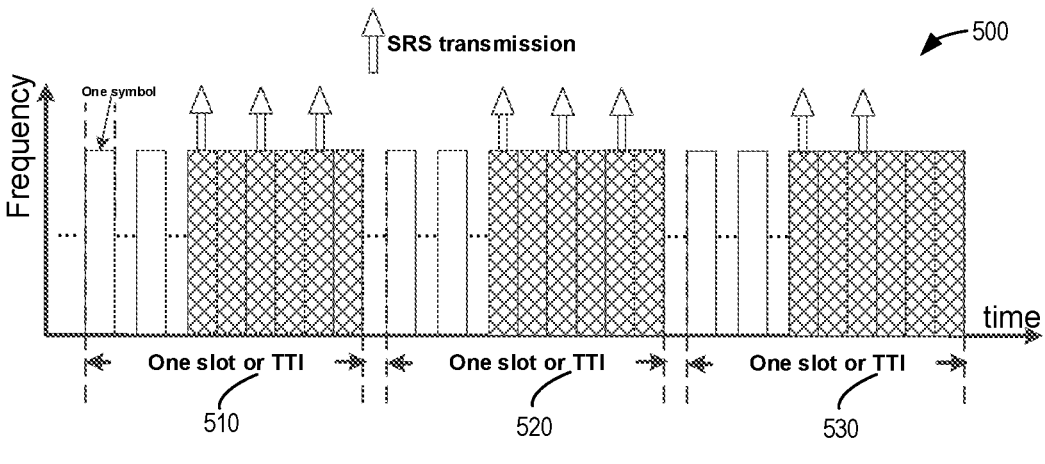
FIG. 5 illustrates a schematic time-frequency diagram illustrating another example of a SRS resource configuration and a SRS transmission according to some embodiments of the present disclosure.

FIG. 5 illustrates a schematic time-frequency diagram 500 illustrating another example of a SRS resource configuration and a SRS transmission according to some embodiments of the present disclosure. Reference sign 510 denotes first resource set in a first slot, reference sign 520 denotes second resource set in a second slot, and reference sign 530 denotes third resource set in a third slot. Each of the resource sets 510, 520 and 530 has three resources. In some embodiments where all three resources in each resource set can be transmitted, the first two resources will be transmitted in the third slot for the third resource set 530, as shown in FIG. 5.

Figure 6:
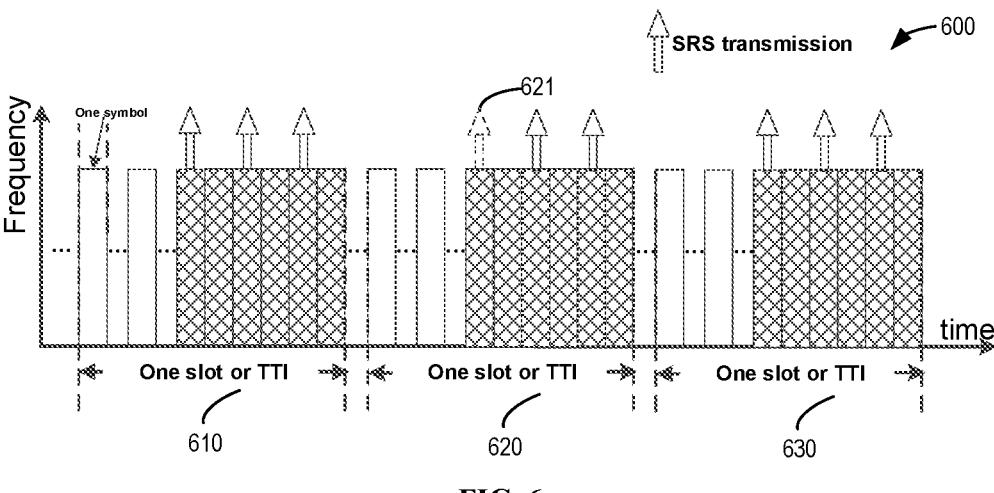
FIG. 6 illustrates a schematic time-frequency diagram illustrating another example of a SRS resource configuration and a SRS transmission according to some embodiments of the present disclosure.

FIG. 6 illustrates a schematic time-frequency diagram 600 illustrating another example of a SRS resource configuration and a SRS transmission according to some embodiments of the present disclosure. Reference sign 610 denotes first resource set in a first slot, reference sign 620 denotes second resource set in a second slot, and reference sign 630 denotes third resource set in a third slot. Each of the resource sets 610, 620 and 630 has three resources. For example, if one resource 621 in the second resource set 620 is dropped or cannot be transmitted, only the other two resources in the second resource set 620 will be transmitted in the second slot, as shown in FIG. 6. In this way, by configuring more resources than that needed, an effective or flexible RS communication can be enhanced.

Example 6

In this example, the first number of resources may comprise four resource sets, each of the four resource sets may comprise two resources, and each resource consists of one port.

Example 7

In this example, the first number of resources may comprise four resource sets, the number of resources in the four resource sets may be {3, 3, 1, 1} or {3, 2, 2, 1}, and each resource consists of one port. Alternatively, the first number of resources may comprise four resource sets, and two of the four resource sets may include 3 resources, and the other two of the four resource set may include 1 resource, and each resource consists of one port. Alternatively, the first number of resources may comprise four resource sets, and one of the four resource sets may include 3 resources, and another one of the four resource sets may include 1 resource, and the other two of the four resource set may include 2 resources, and each resource consists of one port.

Example 8

In this example, the first number of resources may comprise four resource sets, each of the four resource sets comprises three resources, and each resource consists of one port.

In some embodiments, if all resources in each resource set or the first 8 resources in the three or four RS resource sets can be transmitted (e.g. not dropped or not overlapped with other channels/signals (e.g. PDCCH, PDSCH, PUSCH, PUCCH, SRS) or the number of uplink symbols is enough), first or last two resources will be transmitted in the slot for the third resource set and no RS transmitted in the slot for the fourth/last resource set. For example, the first or last or third resource in the third resource set will not be transmitted. Otherwise, zero or one or two resources will be transmitted in the slot for one resource set if not all resources can be transmitted (e.g. the number of uplink symbol in the slot is not enough (e.g. less than 6), or overlapped with other channels/signals (e.g. PDCCH, PDSCH, PUSCH, PUCCH, SRS), or one or more resources are dropped). In this way, by configuring more resources than that needed, an effective or flexible RS communication can be enhanced.

Example 9

In this example, the first number of resources may comprise four resource sets, at least one of the four resource sets comprise three resources and other resource sets comprise one or two resources, and each resource consists of one port.

In some embodiments, if all resources in each resource set or the first 8 resources in the three or four RS resource sets can be transmitted (e.g. not dropped or not overlapped with other channels/signals (e.g. PDCCH, PDSCH, PUSCH, PUCCH, SRS), or the number of uplink symbols is enough), some of the resources will be transmitted in the slot for the last/fourth and/or the third resource set. For example, the other resources will not be transmitted in the slot for the last/fourth and/or the third resource set. Otherwise, N p denotes the number of configured resources in the resource set) resources will be transmitted in the slot for one resource set if only N resources can be transmitted (e.g. the number of uplink symbol in the slot is not enough (e.g. less than 6), or overlapped with other channels/signals (e.g. PDCCH, PDSCH, PUSCH, PUCCH, SRS), or one or more resources are dropped). In this way, by configuring more resources than that needed, an effective or flexible RS communication can be enhanced.

In some embodiments, for aperiodic RS, and two resource sets are configured, and totally at least eight RS resources are configured in the two resource sets, each RS resource consists of one port. In some embodiments, for the first resource set, the number of resources may be X, X is positive integer, and X may be at least one of 2, 3, 4, 5, 6, and for the second resource set, the number of resources may be Y, Y is positive integer, and Y may be at least one of 2, 3, 4, 5, 6. For example, the value of X+Y may be at least 8. For another example, the value of X+Y may be 8.

In some embodiments, for aperiodic RS, and three resource sets are configured, and totally at least eight RS resources are configured in the three resource sets, each RS resource consists of one port. In some embodiments, for the first resource set, the number of resources may be X, X is non-negative integer, and X may be at least one of 0, 1, 2, 3, 4, 5, 6, and for the second resource set, the number of resources may be Y, Y is non-negative integer, and Y may be at least one of 0, 1, 2, 3, 4, 5, 6, and for the third resource set, the number of resources may be Z, Z is non-negative integer, and Z may be at least one of 0, 1, 2, 3, 4, 5, 6. For example, the value of X+Y+Z may be at least 8. For another example, the value of X+Y+Z may be 8.

In some embodiments, for aperiodic RS, and four resource sets are configured, and totally at least eight RS resources are configured in the four resource sets, each RS resource consists of one port. In some embodiments, for the first resource set, the number of resources may be X, X is non-negative integer, and X may be at least one of 0, 1, 2, 3, 4, 5, 6, and for the second resource set, the number of resources may be Y, Y is non-negative integer, and Y may be at least one of 0, 1, 2, 3, 4, 5, 6, and for the third resource set, the number of resources may be Z, Z is non-negative integer, and Z may be at least one of 0, 1, 2, 3, 4, 5, 6, and for the fourth resource set, the number of resources may be W, W is non-negative integer, and W may be at least one of 0, 1, 2, 3, 4, 5, 6. For example, the value of X+Y+Z+W may be at least 8. For another example, the value of X+Y+Z+W may be 8.

In some embodiments, for aperiodic RS, and at least eight resource sets are configured, and totally at least eight RS resources are configured in the at least eight resource sets, each RS resource consists of one port. In some embodiments, for each of the RS resource set, the number of resources may be 0 or 1 or 2.

In some embodiments, if total number of resources >8 or X+Y or X+Y+Z or X+Y+Z+W>8, the terminal device may transmit SRS in the first 8 available SRS resources. For example, the SRS in the remaining SRS resources after the first 8 available SRS resources may not be transmitted. For example, the SRS resource is available if SRS in the SRS resource is not dropped or not overlapped with other channels/signals (e.g. PDCCH, PDSCH, PUSCH, PUCCH, SRS) or the number of uplink symbols is enough for the SRS transmission in the SRS resource or if the resources or the slots for the resources satisfy the minimum timing requirement between the triggering information for the SRS transmission and the SRS resources (in a resource set). In some embodiments, if total number of resources >8 or X+Y or X+Y+Z or X+Y+Z+W>8, and if all resources in each resource set or the first 8 resources in the two or three or four or eight RS resource sets can be transmitted (e.g. not dropped or not overlapped with other channels/signals (e.g. PDCCH, PDSCH, PUSCH, PUCCH, SRS), or the number of uplink symbols is enough), the first 8 resources will be transmitted in the two or three or four or eight RS resource sets. For example, some of the resources will be transmitted in the slot for the last/fourth and/or the third resource set and/or the second resource set. For another example, the other resources will not be transmitted in the slot for the last/fourth and/or the third resource set and/or the second resource set. Otherwise, N (0≤N<p denotes the number of configured resources in the resource set) resources will be transmitted in the slot for one resource set if only N resources can be transmitted (e.g. the number of uplink symbol in the slot is not enough (e.g. less than 6), or overlapped with other channels/signals (e.g. PDCCH, PDSCH, PUSCH, PUCCH, SRS), or one or more resources are dropped).

In some embodiments, a terminal device may be configured with the higher layer parameter usage in SRS-ResourceSet set as 'antennaSwitching', the terminal device may be configured with 1T8R. In some embodiments, the minimum number of RS resource sets may be different for different values of subcarrier spacing. For example, if the value of subcarrier spacing is 15 kHz or 30 kHz or 60 kHz, the number of RS resource sets may be at least 2. For another example, if the value of subcarrier spacing is 120 kHz, the number of RS resource sets may be at least 2 or 3. For another example, if the value of subcarrier spacing is 240 kHz, the number of RS resource sets may be at least 4 or 8. For another example, if the value of subcarrier spacing is 480 kHz, the number of RS resource sets may be at least 4 or 8. For another example, if the value of subcarrier spacing is 960 kHz or 1920 kHz or 3840 kHz, the number of RS resource sets may be at least 8.

Embodiment 3

In this embodiment, the third number is one and the fourth number is six, i.e., the terminal device 120 is configured with 1T6R.

In some embodiments, for periodic or semi-persistent RS, the periodicity for RS resource should be no less than the total number of slots for once antenna switching. For example, one RS resource set configured, and six RS resources within the RS resource set, the periodicity for each RS resource should be same, and the periodicity should be larger than 1 (or the periodicity should be configured to be 2 or larger). For example, the slot offset for some of the RS resources may be different.

In some embodiments, for aperiodic RS, at least six RS resources are needed, each RS resource consists of one port, and at least two resource sets are configured, each resource set includes up to three resources and each resource consists of one port. The details will be given below in connection with Examples 10-13.

Example 10

In this example, the first number of resources may comprise two resource sets, each of the two resource sets comprises three resources, and each resource consists of one port.

Example 11

In this example, the first number of resources may comprise three resource sets, each of the three resource sets comprises two resources, and each resource consists of one port.

In some embodiments, if all three resources in each resource set can be transmitted (e.g. not dropped or not overlapped with other channels/signals (e.g. PDCCH, PDSCH, PUSCH, PUCCH, SRS), or the number of uplink symbols is enough), no RS transmission in the last/third resource set, otherwise, zero or one or two resources will be transmitted in the slot for one resource set, if only zero or one or two resources can be transmitted (e.g. the number of uplink symbol in the slot is not enough (e.g. less than 6), or overlapped with other channels/signals (e.g. PDCCH, PDSCH, PUSCH, PUCCH, SRS), or one or more resources are dropped). In this way, by configuring more resources than that needed, an effective or flexible RS communication can be enhanced.

Example 12

In this example, the first number of resources may comprise three resource sets, each of the three resource sets comprises two resources, and each resource consists of one port.

Example 13

In this example, the first number of resources may comprise three resource sets, at least one of the three resource sets comprise two resources and other resource sets comprise one or two resources, and the total number of resources is larger than six. Each resource consists of one port.

In some embodiments, if all resources in each resource set or the first 6 resources in the three or four RS resource sets can be transmitted (e.g. not dropped or not overlapped with other channels/signals (e.g. PDCCH, PDSCH, PUSCH, PUCCH, SRS), or the number of uplink symbols is enough), none or some of the resources will be transmitted in the slot for the last/fourth and/or the third resource set. Otherwise, N ($0 <= N < p$, p denotes the number of configured resources in the resource set) resources will be transmitted in the slot for one resource set if only N resources can be transmitted (e.g. the number of uplink symbol in the slot is not enough (e.g. less than 6), or overlapped with other channels/signals (e.g. PDCCH, PDSCH, PUSCH, PUCCH, SRS), or one or more resources are dropped). In this way, by configuring more resources than that needed, an effective or flexible RS communication can be enhanced.

In some embodiments, for aperiodic RS, and one resource set is configured, and six RS resources are configured in the resource set, and each RS resource consists of one port.

In some embodiments, for aperiodic RS, and two resource sets are configured, and totally at least six RS resources are configured in the two resource sets, each RS resource consists of one port. In some embodiments, for the first resource set, the number of resources may be X, X is non-negative integer, and X may be at least one of 0, 1, 2, 3, 4, 5, 6, and for the second resource set, the number of resources may be Y, Y is non-negative integer, and Y may be at least one of 0, 1, 2, 3, 4, 5, 6. For example, the value of X+Y may be at least 6. For another example, the value of X+Y may be 6.

In some embodiments, for aperiodic RS, and three resource sets are configured, and totally at least six RS resources are configured in the three resource sets, each RS resource consists of one port. In some embodiments, for the first resource set, the number of resources may be X, X is non-negative integer, and X may be at least one of 0, 1, 2, 3, 4, 5, 6, and for the second resource set, the number of resources may be Y, Y is non-negative integer, and Y may be at least one of 0, 1, 2, 3, 4, 5, 6, and for the third resource set, the number of resources may be Z, Z is non-negative integer, and Z may be at least one of 0, 1, 2, 3, 4, 5, 6. For example, the value of X+Y+Z may be at least 6. For another example, the value of X+Y+Z may be 6.

In some embodiments, for aperiodic RS, and four resource sets are configured, and totally at least six RS resources are configured in the four resource sets, each RS resource consists of one port. In some embodiments, for the first resource set, the number of resources may be X, X is non-negative integer, and X may be at least one of 0, 1, 2, 3, 4, 5, 6, and for the second resource set, the number of resources may be Y, Y is non-negative integer, and Y may be at least one of 0, 1, 2, 3, 4, 5, 6, and for the third resource set, the number of resources may be Z, Z is non-negative integer, and Z may be at least one of 0, 1, 2, 3, 4, 5, 6, and for the fourth resource set, the number of resources may be W, W is non-negative integer, and W may be at least one of 0, 1, 2, 3, 4, 5, 6. For example, the value of X+Y+Z+W may be at least 6. For another example, the value of X+Y+Z+W may be 6.

In some embodiments, for aperiodic RS, and at least six resource sets are configured, and totally at least six RS resources are configured in the at least six resource sets, each RS resource consists of one port. In some embodiments, for each of the RS resource set, the number of resources may be 0 or 1 or 2.

In some embodiments, if total number of resources >6 or X+Y or X+Y+Z or X+Y+Z+W>6, the terminal device may transmit SRS in the first 6 available SRS resources. For example, the SRS in the remaining SRS resources after the first 6 available SRS resources may not be transmitted. For example, the SRS resource is available if SRS in the SRS resource is not dropped or not overlapped with other channels/signals (e.g. PDCCH, PDSCH, PUSCH, PUCCH, SRS) or the number of uplink symbols is enough for the SRS transmission in the SRS resource or if the resources or the slots for the resources satisfy the minimum timing requirement between the triggering information for the SRS transmission and the SRS resources (in a resource set).

In some embodiments, if total number of resources >6 or X+Y or X+Y+Z or X+Y+Z+W>6, and if all resources in each resource set or the first 6 resources in the one or two or three or four or six RS resource sets can be transmitted (e.g. not dropped or not overlapped with other channels/signals (e.g. PDCCH, PDSCH, PUSCH, PUCCH, SRS), or the number of uplink symbols is enough), the first 6 resources will be transmitted in the one or two or three or four or six RS resource sets. For example, some of the resources will be transmitted in the slot for the last/fourth and/or the third resource set and/or the second resource set. For another example, the other resources will not be transmitted in the slot for the last/fourth and/or the third resource set and/or the second resource set. Otherwise, N p denotes the number of configured resources in the resource set) resources will be transmitted in the slot for one resource set if only N resources can be transmitted (e.g. the number of uplink symbol in the slot is not enough (e.g. less than 6), or overlapped with other channels/signals (e.g. PDCCH, PDSCH, PUSCH, PUCCH, SRS), or one or more resources are dropped).

In some embodiments, a terminal device may be configured with the higher layer parameter usage in SRS-ResourceSet set as 'antennaSwitching', the terminal device may be configured with 1T6R. In some embodiments, the minimum number of RS resource sets may be different for different values of subcarrier spacing. For example, if the value of subcarrier spacing is 15 kHz or 30 kHz or 60 kHz, the number of RS resource sets may be at least 1. For another example, if the value of subcarrier spacing is 120 kHz, the number of RS resource sets may be at least 2. For another example, if the value of subcarrier spacing is 240 kHz, the number of RS resource sets may be at least 3. For another example, if the value of subcarrier spacing is 480 kHz or 960 kHz, the number of RS resource sets may be at least 3 or 6. For another example, if the value of subcarrier spacing is 960 kHz or 1920 kHz or 3840 kHz, the number of RS resource sets may be at least 6.

Embodiment 4

In this embodiment, the third number is two and the fourth number is six, i.e., the terminal device 120 is configured with 2T6R.

In some embodiments, at least one resource set are needed, each resource set includes up to three resources and each resource consists of two ports. The details will be given below in connection with Examples 14-18.

Example 14

In this example, the first number of resources may comprise one resource set, the resource set comprises three resources, and each resource consists of two ports.

Example 15

In this example, the first number of resources may comprise two resource sets, one of the two resource sets comprises two resources and the other resource set comprises one resource, and each resource consists of two ports.

Example 16

In this example, the first number of resources may comprise two resource sets, each of the two resource sets comprises two resources, and each resource consists of two ports.

In some embodiments, if all two resources in each resource set or the first three resources can be transmitted (e.g. not dropped or not overlapped with other channels/signals (e.g. PDCCH, PDSCH, PUSCH, PUCCH, SRS) or the number of uplink symbols is enough), the first or last resource will be transmitted in the second resource set. For example, the first or second or last resource in the second resource set may not be transmitted. Otherwise, one resource will be transmitted in the slot for one resource set if only one resource can be transmitted (e.g. the number of uplink symbol in the slot is not enough (e.g. less than 6), or overlapped with other channels/signals (e.g. PDCCH, PDSCH, PUSCH, PUCCH, SRS), or one SRS resource is dropped). In this way, by configuring more resources than that needed, an effective or flexible RS communication can be enhanced.

Example 17

In this example, the first number of resources may comprise two resource sets, each of the two resource sets comprises three resources, and each resource consists of two ports.

In some embodiments, if all three resources in each resource set or the first three resources can be transmitted (e.g. not dropped or not overlapped with other channels/signals (e.g. PDCCH, PDSCH, PUSCH, PUCCH, SRS) or the number of uplink symbols is enough), there is no RS transmission in the second resource set. Otherwise, zero or one or two resource will be transmitted in the slot for one resource set if zero or one or two resource can be transmitted (e.g. the number of uplink symbol in the slot is not enough (e.g. less than 6), or not overlapped with other channels/signals (e.g. PDCCH, PDSCH, PUSCH, PUCCH, SRS), or one or more resources are dropped). In this way, by configuring more resources than that needed, an effective or flexible RS communication can be enhanced.

Example 18

In this example, the first number of resources may comprise two resource sets, one of the two resource sets comprises three resources and the other resource set comprises one or two resources, and the total number of resources is larger than three. Each resource consists of two ports.

In some embodiments, if all resources in each resource set or the first 3 resources in the two RS resource sets can be transmitted (e.g. not dropped or not overlapped with other channels/signals (e.g. PDCCH, PDSCH, PUSCH, PUCCH, SRS) or the number of uplink symbols is enough), none or some of the resources will be transmitted in the slot for the second resource set. For example, the other resources in the second resource set may not be transmitted. Otherwise, N $(0<=N<p$, p denotes the number of configured resources in the resource set) resources will be transmitted in the slot for one resource set if only N resources can be transmitted (e.g. the number of uplink symbol in the slot is not enough (e.g. less than 6), or not overlapped with other channels/signals (e.g. PDCCH, PDSCH, PUSCH, PUCCH, SRS), or one or more resource are dropped). In this way, by configuring more resources than that needed, an effective or flexible RS communication can be enhanced.

In some embodiments, a terminal device may be configured with the higher layer parameter usage in SRS-ResourceSet set as 'antennaSwitching', the terminal device may be configured with 2T6R.

In some embodiments, for aperiodic RS, and one resource set is configured, and three RS resources are configured in the resource set, and each RS resource consists of two ports.

In some embodiments, for aperiodic RS, and two resource sets are configured, and totally at least three RS resources are configured in the two resource sets, each RS resource consists of two ports. In some embodiments, for the first resource set, the number of resources may be X, X is non-negative integer, and X may be at least one of 0, 1, 2, 3, 4, 5, 6, and for the second resource set, the number of resources may be Y, Y is non-negative integer, and Y may be at least one of 0, 1, 2, 3, 4, 5, 6. For example, the value of X+Y may be at least 3. For another example, the value of X+Y may be 3.

In some embodiments, for aperiodic RS, and three resource sets are configured, and totally at least three RS resources are configured in the three resource sets, each RS resource consists of two ports. In some embodiments, for the first resource set, the number of resources may be X, X is non-negative integer, and X may be at least one of 0, 1, 2, 3, 4, 5, 6, and for the second resource set, the number of resources may be Y, Y is non-negative integer, and Y may be at least one of 0, 1, 2, 3, 4, 5, 6, and for the third resource set, the number of resources may be Z, Z is non-negative integer, and Z may be at least one of 0, 1, 2, 3, 4, 5, 6. For example, the value of X+Y+Z may be at least 3. For another example, the value of X+Y+Z may be 3.

In some embodiments, for aperiodic RS, and four resource sets are configured, and totally at least three RS resources are configured in the four resource sets, each RS resource consists of two ports. In some embodiments, for the first resource set, the number of resources may be X, X is non-negative integer, and X may be at least one of 0, 1, 2, 3, 4, 5, 6, and for the second resource set, the number of resources may be Y, Y is non-negative integer, and Y may be at least one of 0, 1, 2, 3, 4, 5, 6, and for the third resource set, the number of resources may be Z, Z is non-negative integer, and Z may be at least one of 0, 1, 2, 3, 4, 5, 6, and for the fourth resource set, the number of resources may be W, W is non-negative integer, and W may be at least one of 0, 1, 2, 3, 4, 5, 6. For example, the value of X+Y+Z+W may be at least 3. For another example, the value of X+Y+Z+W may be 3.

In some embodiments, for aperiodic RS, and at least three resource sets are configured, and totally at least three RS resources are configured in the at least three resource sets, each RS resource consists of two ports. In some embodiments, for each of the RS resource set, the number of resources may be 0 or 1 or 2 or 3.

In some embodiments, if total number of resources >3 or X+Y or X+Y+Z or X+Y+Z+W>3, the terminal device may transmit SRS in the first 3 available SRS resources. For example, the SRS in the remaining SRS resources after the first 3 available SRS resources may not be transmitted. For example, the SRS resource is available if SRS in the SRS resource is not dropped or not overlapped with other channels/signals (e.g. PDCCH, PDSCH, PUSCH, PUCCH, SRS) or the number of uplink symbols is enough for the SRS transmission in the SRS resource or if the resources or the slots for the resources satisfy the minimum timing requirement between the triggering information for the SRS transmission and the SRS resources (in a resource set).

In some embodiments, if total number of resources >3 or X+Y or X+Y+Z or X+Y+Z+W>3, and if all resources in each resource set or the first 3 resources in the one or two or three or four RS resource sets can be transmitted (e.g. not dropped or not overlapped with other channels/signals (e.g. PDCCH, PDSCH, PUSCH, PUCCH, SRS), or the number of uplink symbols is enough), the first 3 resources will be transmitted in the one or two or three or four RS resource sets. For example, some of the resources will be transmitted in the slot for the last/fourth and/or the third resource set and/or the second resource set. For another example, the other resources will not be transmitted in the slot for the last/fourth and/or the third resource set and/or the second resource set. Otherwise, N p denotes the number of configured resources in the resource set) resources will be transmitted in the slot for one resource set if only N resources can be transmitted (e.g. the number of uplink symbol in the slot is not enough (e.g. less than 6), or overlapped with other channels/signals (e.g. PDCCH, PDSCH, PUSCH, PUCCH, SRS), or one or more resources are dropped).

In some embodiments, the minimum number of RS resource sets may be different for different values of subcarrier spacing. For example, if the value of subcarrier spacing is 15 kHz or 30 kHz or 60 kHz or 120 kHz, the number of RS resource sets may be at least 1. For another example, if the value of subcarrier spacing is 240 kHz or 480 kHz, the number of RS resource sets may be at least 2. For another example, if the value of subcarrier spacing is 480 kHz or 960 kHz or 1920 kHz or 3840 kHz, the number of RS resource sets may be at least 3.

In some embodiments, a terminal device may be configured with the higher layer parameter usage in SRS-ResourceSet set as 'antennaSwitching', the terminal device may be configured with 1T4R.

In some embodiments, for aperiodic RS, and one resource set is configured, and four RS resources are configured in the resource set, and each RS resource consists of one port.

In some embodiments, for aperiodic RS, and two resource sets are configured, and totally at least four RS resources are configured in the two resource sets, each RS resource consists of one port. In some embodiments, for the first resource set, the number of resources may be X, X is non-negative integer, and X may be at least one of 0, 1, 2, 3, 4, 5, 6, and for the second resource set, the number of resources may be Y, Y is non-negative integer, and Y may be at least one of 0, 1, 2, 3, 4, 5, 6. For example, the value of X+Y may be at least 4. For example, the value of X+Y may be 4.

In some embodiments, for aperiodic RS, and three resource sets are configured, and totally at least four RS resources are configured in the three resource sets, each RS resource consists of one port. In some embodiments, for the first resource set, the number of resources may be X, X is non-negative integer, and X may be at least one of 0, 1, 2, 3, 4, 5, 6, and for the second resource set, the number of resources may be Y, Y is non-negative integer, and Y may be at least one of 0, 1, 2, 3, 4, 5, 6, and for the third resource set, the number of resources may be Z, Z is non-negative integer, and Z may be at least one of 0, 1, 2, 3, 4, 5, 6. For example, the value of X+Y+Z may be at least 4. For another example, the value of X+Y+Z may be 4.

In some embodiments, for aperiodic RS, and four resource sets are configured, and totally at least four RS resources are configured in the four resource sets, each RS resource consists of one port. In some embodiments, for the first resource set, the number of resources may be X, X is non-negative integer, and X may be at least one of 0, 1, 2, 3, 4, 5, 6, and for the second resource set, the number of resources may be Y, Y is non-negative integer, and Y may be at least one of 0, 1, 2, 3, 4, 5, 6, and for the third resource set, the number of resources may be Z, Z is non-negative integer, and Z may be at least one of 0, 1, 2, 3, 4, 5, 6, and for the fourth resource set, the number of resources may be W, W is non-negative integer, and W may be at least one of 0, 1, 2, 3, 4, 5, 6. For example, the value of X+Y+Z+W may be at least 4. For example, the value of X+Y+Z+W may be 4.

In some embodiments, for aperiodic RS, and at least four resource sets are configured, and totally at least four RS resources are configured in the at least four resource sets, each RS resource consists of one port. In some embodiments, for each of the RS resource set, the number of resources may be 0 or 1 or 2.

In some embodiments, if total number of resources >4 or X+Y or X+Y+Z or X+Y+Z+W>4, the terminal device may transmit SRS in the first 4 available SRS resources. For example, the SRS in the remaining SRS resources after the first 4 available SRS resources may not be transmitted. For example, the SRS resource is available if SRS in the SRS resource is not dropped or not overlapped with other channels/signals (e.g. PDCCH, PDSCH, PUSCH, PUCCH, SRS) or the number of uplink symbols is enough for the SRS transmission in the SRS resource or if the resources or the slots for the resources satisfy the minimum timing requirement between the triggering information for the SRS transmission and the SRS resources (in a resource set). In some embodiments, if total number of resources >4 or X+Y or X+Y+Z or X+Y+Z+W>4, and if all resources in each resource set or the first 4 resources in the one or two or three or four RS resource sets can be transmitted (e.g. not dropped or not overlapped with other channels/signals (e.g. PDCCH, PDSCH, PUSCH, PUCCH, SRS), or the number of uplink symbols is enough), the first 4 resources will be transmitted in the one or two or three or four RS resource sets. For example, some of the resources will be transmitted in the slot for the last/fourth and/or the third resource set and/or the second resource set. For another example, the other resources will not be transmitted in the slot for the last/fourth and/or the third resource set and/or the second resource set. Otherwise, N ($0 \leq N < p$, p denotes the number of configured resources in the resource set) resources will be transmitted in the slot for one resource set if only N resources can be transmitted (e.g. the number of uplink symbol in the slot is not enough (e.g. less than 6), or overlapped with other channels/signals (e.g. PDCCH, PDSCH, PUSCH, PUCCH, SRS), or one or more resources are dropped).

In some embodiments, the minimum number of RS resource sets may be different for different values of subcarrier spacing. For example, if the value of subcarrier spacing is 15 kHz or 30 kHz or 60 kHz or 120 kHz, the number of RS resource sets may be at least 1. For another example, if the value of subcarrier spacing is 240 kHz or 480 kHz or 960 kHz, the number of RS resource sets may be at least 2. For another example, if the value of subcarrier spacing is 480 kHz or 960 kHz or 1920 kHz or 3840 kHz, the number of RS resource sets may be at least 3.

In some embodiments, a terminal device may be configured with the higher layer parameter usage in SRS-ResourceSet set as 'antennaSwitching', the terminal device may be configured with 2T8R.

In some embodiments, for aperiodic RS, and one resource set is configured, and four RS resources are configured in the resource set, and each RS resource consists of two ports.

In some embodiments, for aperiodic RS, and two resource sets are configured, and totally at least four RS resources are configured in the two resource sets, each RS resource consists of two ports. In some embodiments, for the first resource set, the number of resources may be X, X is non-negative integer, and X may be at least one of 0, 1, 2, 3, 4, 5, 6, and for the second resource set, the number of resources may be Y, Y is non-negative integer, and Y may be at least one of 0, 1, 2, 3, 4, 5, 6. For example, the value of X+Y may be at least 4. For example, the value of X+Y may be 4.

In some embodiments, for aperiodic RS, and three resource sets are configured, and totally at least four RS resources are configured in the three resource sets, each RS resource consists of two ports. In some embodiments, for the first resource set, the number of resources may be X, X is non-negative integer, and X may be at least one of 0, 1, 2, 3, 4, 5, 6, and for the second resource set, the number of resources may be Y, Y is non-negative integer, and Y may be at least one of 0, 1, 2, 3, 4, 5, 6, and for the third resource set, the number of resources may be Z, Z is non-negative integer, and Z may be at least one of 0, 1, 2, 3, 4, 5, 6. For example, the value of X+Y+Z may be at least 4. For another example, the value of X+Y+Z may be 4.

In some embodiments, for aperiodic RS, and four resource sets are configured, and totally at least four RS resources are configured in the four resource sets, each RS resource consists of two ports. In some embodiments, for the first resource set, the number of resources may be X, X is non-negative integer, and X may be at least one of 0, 1, 2, 3, 4, 5, 6, and for the second resource set, the number of resources may be Y, Y is non-negative integer, and Y may be at least one of 0, 1, 2, 3, 4, 5, 6, and for the third resource set, the number of resources may be Z, Z is non-negative integer, and Z may be at least one of 0, 1, 2, 3, 4, 5, 6, and for the fourth resource set, the number of resources may be W, W is non-negative integer, and W may be at least one of 0, 1, 2, 3, 4, 5, 6. For example, the value of X+Y+Z+W may be at least 4. For example, the value of X+Y+Z+W may be 4.

In some embodiments, for aperiodic RS, and at least four resource sets are configured, and totally at least four RS resources are configured in the at least four resource sets, each RS resource consists of two ports. In some embodiments, for each of the RS resource set, the number of resources may be 0 or 1 or 2.

In some embodiments, if total number of resources >4 or X+Y or X+Y+Z or X+Y+Z+W>4, and if all resources in each resource set or the first 4 resources in the one or two or three or four RS resource sets can be transmitted (e.g. not dropped or not overlapped with other channels/signals (e.g. PDCCH, PDSCH, PUSCH, PUCCH, SRS), or the number of uplink symbols is enough), the first 4 resources will be transmitted in the one or two or three or four RS resource sets. For example, some of the resources will be transmitted in the slot for the last/fourth and/or the third resource set and/or the second resource set. For another example, the other resources will not be transmitted in the slot for the last/fourth and/or the third resource set and/or the second resource set. Otherwise, N p denotes the number of configured resources in the resource set) resources will be transmitted in the slot for one resource set if only N resources can be transmitted (e.g. the number of uplink symbol in the slot is not enough (e.g. less than 6), or overlapped with other channels/signals (e.g. PDCCH, PDSCH, PUSCH, PUCCH, SRS), or one or more resources are dropped).

In some embodiments, the minimum number of RS resource sets may be different for different values of subcarrier spacing. For example, if the value of subcarrier spacing is 15 kHz or 30 kHz or 60 kHz or 120 kHz, the number of RS resource sets may be at least 1. For another example, if the value of subcarrier spacing is 240 kHz or 480 kHz or 960 kHz, the number of RS resource sets may be at least 2. For another example, if the value of subcarrier spacing is 480 kHz or 960 kHz or 1920 kHz or 3840 kHz, the number of RS resource sets may be at least 3.

In some embodiments, a terminal device may be configured with the higher layer parameter usage in SRS-ResourceSet set as 'antennaSwitching', the terminal device may be configured with xTyR. x is positive integer, and x may be at least one of 1, 2 and 4. y is positive integer, and y may be at least one of 1, 2, 4, 6, 8. In some embodiments, the total number of configured SRS ports may be M, M is positive integer, and M≥y. For example, y≤M≤64. In some embodiments, the total number of SRS resources may be N, N is positive integer, and N≥y/x or N≥ceil(y/x). For example, N=ceil(y/x). In some embodiments, the number of SRS resource sets (e.g. Si (1<=i<=P) for antenna switching may be P, P is positive integer. For example, 1≤P≤16. And for a given SRS resource set Si, there are Ni SRS resources (e.g. R_i_j, (1<=j<=Ni)), and for a given SRS resource R_i_j, there are M_i_j SRS ports. For example, $$\sum_{i=1}^{P}\sum_{j=1}^{Ni} M_{i,j} \geq y.$$

For another example, $$\sum_{i=1}^{P} Ni \geq y/x.$$

In some embodiments, if the number of configured SRS resources is larger than the number of SRS resources needed for antenna switching. For example, N>y/x or N>ceil(y/x). The terminal device may transmit the SRS in the first y/x or first ceil(y/x) available SRS resources. For example, the SRS in the remaining SRS resources after the first y/x or first ceil(y/x) available SRS resources may not be transmitted. In some embodiments, the SRS resource is available if SRS in the SRS resource is not dropped or not overlapped with other channels/signals (e.g. PDCCH, PDSCH, PUSCH, PUCCH, SRS) or the number of uplink symbols is enough for the SRS transmission in the SRS resource or if the resources or the slots for the resources satisfy the minimum timing requirement between the triggering information for the SRS transmission and the SRS resources (in a resource set).

In some embodiments, if the terminal device is configured with the higher layer parameter usage in SRS-ResourceSet set as 'antennaSwitching', the terminal device is configured with 1T1R. For example, one SRS resource is needed. The terminal device 120 may be configured with N SRS resources, and each SRS resource consists of one SRS port. For example, N is positive integer, and 1<N≤64. The terminal device 120 may transmit SRS in the first one available SRS resource. For example, the SRS in the remaining SRS resources after the first one available SRS resource may not be transmitted.

In some embodiments, if the terminal device is configured with the higher layer parameter usage in SRS-ResourceSet set as 'antennaSwitching', the terminal device 120 is configured with 1T2R. For example, two SRS resources are needed. The terminal device 120 may be configured with N SRS resources, and each SRS resource consists of one SRS port. For example, N is positive integer, and 2<N≤64. The terminal device 120 may transmit SRS in the first 2 available SRS resources. For example, the SRS in the remaining SRS resources after the first two available SRS resources may not be transmitted.

In some embodiments, if the terminal device is configured with the higher layer parameter usage in SRS-ResourceSet set as 'antennaSwitching', the terminal device 120 is configured with 1T4R. For example, four SRS resources are needed. The terminal device 120 may be configured with N SRS resources, and each SRS resource consists of one SRS port. For example, N is positive integer, and 4<N≤64. The terminal device 120 may transmit SRS in the first 4 available SRS resources. For example, the SRS in the remaining SRS resources after the first four available SRS resources may not be transmitted.

In some embodiments, if the terminal device 120 is configured with the higher layer parameter usage in SRS-ResourceSet set as 'antennaSwitching', the terminal device 120 is configured with 1T6R. For example, six SRS resources are needed. The terminal device 120 may be configured with N SRS resources, and each SRS resource consists of one SRS port. For example, N is positive integer, and 6<N≤64. The terminal device 120 may transmit SRS in the first 6 available SRS resources. For example, the SRS in the remaining SRS resources after the first 6 available SRS resources may not be transmitted.

In some embodiments, if the terminal device 120 is configured with the higher layer parameter usage in SRS-ResourceSet set as 'antennaSwitching', the terminal device is configured with 1T8R. For example, eight SRS resources are needed. The terminal device 120 may be configured with N SRS resources, and each SRS resource consists of one SRS port. For example, N is positive integer, and 8<N≤64. The terminal device 120 may transmit SRS in the first 8 available SRS resources. For example, the SRS in the remaining SRS resources after the first 8 available SRS resources may not be transmitted.

In some embodiments, if the terminal device 120 is configured with the higher layer parameter usage in SRS-ResourceSet set as 'antennaSwitching', the terminal device 120 is configured with 2T2R. For example, one SRS resource is needed. The terminal device 120 may be configured with N SRS resources, and each SRS resource consists of two SRS ports. For example, N is positive integer, and 1<N≤64. The terminal device 120 may transmit SRS in the first one available SRS resource. For example, the SRS in the remaining SRS resources after the first one available SRS resource may not be transmitted.

In some embodiments, if the terminal device 120 is configured with the higher layer parameter usage in SRS-ResourceSet set as 'antennaSwitching', the terminal device 120 is configured with 2T4R. For example, two SRS resources are needed. The terminal device 120 may be configured with N SRS resources, and each SRS resource consists of two SRS ports. For example, N is positive integer, and 2<N≤64. The terminal device 120 may transmit SRS in the first 2 available SRS resources. For example, the SRS in the remaining SRS resources after the first two available SRS resources may not be transmitted.

In some embodiments, if the terminal device 120 is configured with the higher layer parameter usage in SRS-ResourceSet set as 'antennaSwitching', the terminal device 120 is configured with 2T6R. For example, three SRS resources are needed. The terminal device 120 may be configured with N SRS resources, and each SRS resource consists of two SRS ports. For example, N is positive integer, and 3<N≤64. The terminal device 120 may transmit SRS in the first 3 available SRS resources. For example, the SRS in the remaining SRS resources after the first three available SRS resources may not be transmitted.

In some embodiments, if the terminal device 120 is configured with the higher layer parameter usage in SRS-ResourceSet set as 'antennaSwitching', the terminal device 120 is configured with 2T8R. For example, four SRS resources are needed. The terminal device 120 may be configured with N SRS resources, and each SRS resource consists of two SRS ports. For example, N is positive integer, and 4<N≤64. The terminal device 120 may transmit SRS in the first 4 available SRS resources. For example, the SRS in the remaining SRS resources after the first four available SRS resources may not be transmitted.

In some embodiments, if the terminal device 120 is configured with the higher layer parameter usage in SRS-ResourceSet set as 'antennaSwitching', the terminal device 120 is configured with 4T4R. For example, one SRS resource is needed. The terminal device 120 may be configured with N SRS resources, and each SRS resource consists of four SRS ports. For example, N is positive integer, and 1<N≤64. The terminal device 120 may transmit SRS in the first one available SRS resource. For example, the SRS in the remaining SRS resources after the first one available SRS resource may not be transmitted.

In some embodiments, if the terminal device is configured with the higher layer parameter usage in SRS-ResourceSet set as 'antennaSwitching', the terminal device 120 is configured with 4T6R. For example, two SRS resources are needed. The terminal device 120 may be configured with N SRS resources, and each SRS resource consists of four or two SRS ports. For example, N is positive integer, and 2<N≤64. The terminal device 120 may transmit SRS in the first 2 available SRS resources. For example, the SRS in the remaining SRS resources after the first two available SRS resources may not be transmitted.

In some embodiments, if the terminal device 120 is configured with the higher layer parameter usage in SRS-ResourceSet set as 'antennaSwitching', the terminal device 120 is configured with 4T8R. For example, two SRS resources are needed. The terminal device 120 may be configured with N SRS resources, and each SRS resource consists of four SRS ports. For example, N is positive integer, and 4<N≤64. The terminal device 120 may transmit SRS in the first 4 available SRS resources. For example, the SRS in the remaining SRS resources after the first 4 available SRS resources may not be transmitted.

In some embodiments, if the terminal device 120 is configured with the higher layer parameter usage in SRS-ResourceSet set as 'antennaSwitching', the terminal device 120 is configured with 6T6R. For example, one SRS resource is needed. The terminal device 120 may be configured with N SRS resources, and each SRS resource consists of six SRS ports. For example, N is positive integer, and 1<N≤64. The terminal device 120 may transmit SRS in the first one available SRS resource. For example, the SRS in the remaining SRS resources after the first one available SRS resource may not be transmitted.

In some embodiments, if the terminal device 120 is configured with the higher layer parameter usage in SRS-ResourceSet set as 'antennaSwitching', the terminal device 120 is configured with 8T8R. For example, one SRS resource is needed. The terminal device 120 may be configured with N SRS resources, and each SRS resource consists of eight SRS ports. For example, N is positive integer, and 1<N≤64. The terminal device 120 may transmit SRS in the first one available SRS resource. For example, the SRS in the remaining SRS resources after the first one available SRS resource may not be transmitted.

So far, the cases of 4T6R, 1T8R, 1T6R, 1T4R, 2T8R, 1T1R, 1T2R, 2T2R, 4T4R, 4T8R and 2T6R are described. In some embodiments, for xTyR, if y=6 or 8, x may be larger than 1. For example, x may be any one of {2 or 4}. As another example, if y=6, x can only be 2. As another example, if y=8, x can only be 4. In this way, an effective RS communication can be further enhanced.

Return to FIG. 2, upon determining the information indicating the first number of resources, the network device 110 may transmit 220 the information to the terminal device 120. In some embodiments, the network device 110 may configure the information to the terminal device 120 in a radio resource control (RRC) message. It should be noted that the information may be transmitted in any other suitable ways, for example, in a media access control (MAC) control element (CE) or a downlink control information (DCI), and the present disclosure does not make limitation for this.

Upon receiving the information, the terminal device 120 may determine 230 a second number of resources from the first number of resources. In some embodiments, the second number may be equal to the first number. In this case, the number of the configured resources is equal to the number of the needed or used resources.

For example, in some embodiments where the terminal device 120 is configured with 4T6R as described in Embodiment 1, the first number of resources comprise first and second resources and each of the first and second resources comprises three resources, the second number of resources may comprise first and second resources.

In some embodiments where the terminal device 120 is configured with 1T8R, if as described in Example 4 of Embodiment 2, the first number of resources comprise three resource sets, two of the three resource sets each comprises three resources and the other one of the three resource sets comprises two resources, the second number of resources may comprise all resources of the three resource sets.

In some embodiments where the terminal device 120 is configured with 1T8R, if as described in Example 6 of Embodiment 2, the first number of resources comprise four resource sets, each of the four resource sets may comprise two resources, the second number of resources may comprise all resources of the four resource sets.

In some embodiments where the terminal device 120 is configured with 1T8R, if as described in Example 7 of Embodiment 2, the first number of resources comprise four resource sets, the number of resources in the four resource sets may be {3, 3, 1, 1} or {3, 2, 2, 1}, the second number of resources may comprise all resources of the four resource sets.

In some embodiments where the terminal device 120 is configured with 1T6R, if as described in Example 10 of Embodiment 3, the first number of resources comprise two resource sets, each of the two resource sets comprises three resources, the second number of resources may comprise all resources of the two resource sets.

In some embodiments where the terminal device 120 is configured with 1T6R, if as described in Example 12 of Embodiment 3, the first number of resources comprise three resource sets, each of the three resource sets comprises two resources, the second number of resources may comprise all resources of the three resource sets.

In some embodiments where the terminal device 120 is configured with 2T6R, if as described in Example 14 of Embodiment 4, the first number of resources comprise one resource set, the resource set comprises three resources, the second number of resources may comprise the resource sets.

In some embodiments where the terminal device 120 is configured with 2T6R, if as described in Example 15 of Embodiment 4, the first number of resources comprise two resource sets, one of the two resource sets comprises two resources and the other resource set comprises one resource, the second number of resources may comprise the two resource sets.

In some alternative embodiments, the second number may be smaller than the first number. In this case, the number of the configured resources is larger than the number of the needed or used resources.

For example, in some embodiments where the terminal device 120 is configured with 1T8R as described in Example 5 of Embodiment 2, the first number of resources comprise three resource sets, each of the three resource sets comprises three resources, the second number of resources may comprise eight resources in the three resource sets.

In some embodiments where the terminal device 120 is configured with 1T8R as described in Example 8 of Embodiment 2, the first number of resources comprise four resource sets, each of the four resource sets comprises three resources, the second number of resources may comprise eight resources in the four resource sets.

In some embodiments where the terminal device 120 is configured with 1T8R as described in Example 9 of Embodiment 2, the first number of resources comprise four resource sets, at least one of the four resource sets comprise three resources and other resource sets comprise one or two resources, the second number of resources may comprise eight resources in the four resource sets.

In some embodiments where the terminal device 120 is configured with 1T6R as described in Example 11 of Embodiment 3, the first number of resources comprise three resource sets, each of the three resource sets comprises three resources, the second number of resources may comprise six resources in the three resource sets.

In some embodiments where the terminal device 120 is configured with 1T6R as described in Example 13 of Embodiment 3, the first number of resources comprise three resource sets, at least one of the three resource sets comprise two resources and other resource sets comprise one or two resources and the total number of resources is larger than six, the second number of resources may comprise six resources in the three resource sets.

In some embodiments where the terminal device 120 is configured with 2T6R as described in Example 16 of Embodiment 4, the first number of resources comprise two resource sets, each of the two resource sets comprises two resources, the second number of resources may comprise three resources in the two resource sets.

In some embodiments where the terminal device 120 is configured with 2T6R as described in Example 17 of Embodiment 4, the first number of resources comprise two resource sets, each of the two resource sets comprises three resources, the second number of resources may comprise three resources in the two resource sets. For example, the second number of resources may comprise one of the two resource sets.

In some embodiments where the terminal device 120 is configured with 2T6R as described in Example 18 of Embodiment 4, the first number of resources comprise one of the two resource sets comprises three resources and the other resource set comprises one or two resources, and the total number of resources is larger than three, the second number of resources may comprise three resources in the two resource sets.

It should be noted that the determination of the second number of resources can be made in any suitable ways. Return to FIG. 2 again, upon determining the second number of resources, the terminal device 120 may perform 240 the communication of the RS based on the second number of resources. In some embodiments, the terminal device 120 may associate at least a portion of ports of the second number of resources with respective receive antenna ports of the terminal device 120. In some embodiments, the number of ports associated with the receive antenna ports of the terminal device 120 may be equal to the number of the receive antenna ports.

In some embodiments, the number of ports associated with the receive antenna ports of the terminal device 120 may be larger than the number of the receive antenna ports, as described in connection with FIG. 3. In this way, channel estimation and compensation can be advantageously carried out.

In some embodiments, the terminal device 120 may allocate a power for the associated ports of the second number resources. In some embodiments, the terminal device 120 may equally allocate a power for the RS communication among all ports of each resource. In some embodiments, the terminal device 120 may equally allocate a power for the RS communication among only the associated ports of each resource.

According to the process in FIG. 2, a RS resource configuration and a RS communication for more antenna ports are provided. Corresponding to the process described in FIG. 2, embodiments of the present disclosure provide methods of communication implemented at a terminal device and at a network device. These methods will be described below with reference to FIGS. 7-8.

FIG. 7 illustrates an example method 700 of communication implemented at a terminal device in accordance with some embodiments of the present disclosure. For example, the method 700 may be performed at the terminal device 120 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard.

At block 710, the terminal device 120 receives, from the network device 110, information indicating a first number of resources configured for communication of a RS. In some embodiments, the first number are associated with a third number of transmit antenna ports and a fourth number of receive antenna ports of the terminal device, and the fourth number is larger than a predetermined number. In some embodiments, the predetermined number is larger than or equal to four. In some embodiments, the predetermined number may be a number larger than four and smaller than eight. It should be noted that the predetermined number may be any other suitable number. In some embodiments where the fourth number is one of six and eight, the third number may be larger than one.

In some embodiments where the third number is four and the fourth number is six, i.e., the terminal device 120 is configured with 4T6R, the first number of resources may comprise a first resource and a second resource, each of the first and second resources consisting of four ports. More details are described in Embodiment 1 and are not repeated here for concise.

In some embodiments where the third number is one and the fourth number is eight, i.e., the terminal device 120 is configured with 1T8R, the first number of resources may comprise at least three resource sets, each of the at least three resource sets having up to three resources, and each resource consisting of one port.

In some embodiments, the first number of resources may comprise three resource sets, two of the three resource sets each comprises three resources and the other one of the three resource sets comprises two resources, and each resource consists of one port. In some embodiments, the first number of resources may comprise three resource sets, each of the three resource sets comprises three resources, and each resource consists of one port. In some embodiments, the first number of resources may comprise four resource sets, each of the four resource sets may comprise two resources, and each resource consists of one port.

In some embodiments, the first number of resources may comprise four resource sets, the number of resources in the four resource sets may be {3, 3, 1, 1} or {3, 2, 2, 1}, and each resource consists of one port. In some embodiments, the first number of resources may comprise four resource sets, each of the four resource sets comprises three resources, and each resource consists of one port. In some embodiments, the first number of resources may comprise four resource sets, at least one of the four resource sets comprise three resources and other resource sets comprise one or two resources, and each resource consists of one port. More details are described in Embodiment 2 and are not repeated here for concise.

In some embodiments where the third number is one and the fourth number is six, i.e., the terminal device 120 is configured with 1T6R, the first number of resources may comprise at least two resource sets, each of the at least two resource sets having up to three resources, and each resource consisting of one port.

In some embodiments, the first number of resources may comprise two resource sets, each of the two resource sets comprises three resources, and each resource consists of one port. In some embodiments, the first number of resources may comprise three resource sets, each of the three resource sets comprises three resources, and each resource consists of one port. In some embodiments, the first number of resources may comprise three resource sets, each of the three resource sets comprises two resources, and each resource consists of one port. In some embodiments, the first number of resources may comprise three resource sets, at least one of the three resource sets comprise two resources and other resource sets comprise one or two resources, and the total number of resources is larger than six. More details are described in Embodiment 3 and are not repeated here for concise.

In some embodiments where the third number is two and the fourth number is six, i.e., the terminal device 120 is configured with 2T6R, the first number of resources may comprise at least one resource set, each of the at least one resource set having up to three resources, and each resource consisting of one port.

In some embodiments, the first number of resources may comprise one resource set, the resource set comprises three resources, and each resource consists of one port. In some embodiments, the first number of resources may comprise two resource sets, one of the two resource sets comprises two resources and the other resource set comprises one resource, and each resource consists of one port. In some embodiments, the first number of resources may comprise two resource sets, each of the two resource sets comprises two resources, and each resource consists of one port. In some embodiments, the first number of resources may comprise two resource sets, each of the two resource sets comprises three resources, and each resource consists of one port. In some embodiments, the first number of resources may comprise two resource sets, one of the two resource sets comprises three resources and the other resource set comprises one or two resources, and the total number of resources is larger than three. More details are described in Embodiment 4 and are not repeated here for concise.

Return to FIG. 7, upon receiving the information indicating the first number of resources, at block 720, the terminal device 120 determines a second number of resources from the first number of resources. In some embodiments, the second number may be equal to the first number. In this case, the number of the configured resources is equal to the number of the needed or used resources.

In some embodiments where the terminal device 120 is configured with 4T6R as described in Embodiment 1, the first number of resources comprise first and second resources and each of the first and second resources comprises three resources, the second number of resources may comprise first and second resources.

In some embodiments where the terminal device 120 is configured with 1T8R, if as described in Example 4 of Embodiment 2, the first number of resources comprise three resource sets, two of the three resource sets each comprises three resources and the other one of the three resource sets comprises two resources, the second number of resources may comprise all resources of the three resource sets.

In some embodiments where the terminal device 120 is configured with 1T8R, if as described in Example 6 of Embodiment 2, the first number of resources comprise four resource sets, each of the four resource sets may comprise two resources, the second number of resources may comprise all resources of the four resource sets.

In some embodiments where the terminal device 120 is configured with 1T8R, if as described in Example 7 of Embodiment 2, the first number of resources comprise four resource sets, the number of resources in the four resource sets may be {3, 3, 1, 1} or {3, 2, 2, 1}, the second number of resources may comprise all resources of the four resource sets.

In some embodiments where the terminal device 120 is configured with 1T6R, if as described in Example 10 of Embodiment 3, the first number of resources comprise two resource sets, each of the two resource sets comprises three resources, the second number of resources may comprise all resources of the two resource sets.

In some embodiments where the terminal device 120 is configured with 1T6R, if as described in Example 12 of Embodiment 3, the first number of resources comprise three resource sets, each of the three resource sets comprises two resources, the second number of resources may comprise all resources of the three resource sets.

In some embodiments where the terminal device 120 is configured with 2T6R, if as described in Example 14 of Embodiment 4, the first number of resources comprise one resource set, the resource set comprises three resources, the second number of resources may comprise the resource sets.

In some embodiments where the terminal device 120 is configured with 2T6R, if as described in Example 15 of Embodiment 4, the first number of resources comprise two resource sets, one of the two resource sets comprises two resources and the other resource set comprises one resource, the second number of resources may comprise the two resource sets.

In some alternative embodiments, the second number may be smaller than the first number. In this case, the number of the configured resources is larger than the number of the needed or used resources.

In some embodiments where the terminal device 120 is configured with 1T8R as described in Example 5 of Embodiment 2, the first number of resources comprise three resource sets, each of the three resource sets comprises three resources, the second number of resources may comprise eight resources in the three resource sets.

In some embodiments where the terminal device 120 is configured with 1T8R as described in Example 8 of Embodiment 2, the first number of resources comprise four resource sets, each of the four resource sets comprises three resources, the second number of resources may comprise eight resources in the four resource sets.

In some embodiments where the terminal device 120 is configured with 1T8R as described in Example 9 of Embodiment 2, the first number of resources comprise four resource sets, at least one of the four resource sets comprise three resources and other resource sets comprise one or two resources, the second number of resources may comprise eight resources in the four resource sets.

In some embodiments where the terminal device 120 is configured with 1T6R as described in Example 11 of Embodiment 3, the first number of resources comprise three resource sets, each of the three resource sets comprises three resources, the second number of resources may comprise six resources in the three resource sets.

In some embodiments where the terminal device 120 is configured with 1T6R as described in Example 13 of Embodiment 3, the first number of resources comprise three resource sets, at least one of the three resource sets comprise two resources and other resource sets comprise one or two resources and the total number of resources is larger than six, the second number of resources may comprise six resources in the three resource sets.

In some embodiments where the terminal device 120 is configured with 2T6R as described in Example 16 of Embodiment 4, the first number of resources comprise two resource sets, each of the two resource sets comprises two resources, the second number of resources may comprise three resources in the two resource sets.

In some embodiments where the terminal device 120 is configured with 2T6R as described in Example 17 of Embodiment 4, the first number of resources comprise two resource sets, each of the two resource sets comprises three resources, the second number of resources may comprise three resources in the two resource sets. For example, the second number of resources may comprise one of the two resource sets.

In some embodiments where the terminal device 120 is configured with 2T6R as described in Example 18 of Embodiment 4, the first number of resources comprise one of the two resource sets comprises three resources and the other resource set comprises one or two resources, and the total number of resources is larger than three, the second number of resources may comprise three resources in the two resource sets.

Return to FIG. 7 again, at block 730, the terminal device 120 performs the communication of the RS based on the second number of resources. In some embodiments, the terminal device 120 may associate at least a portion of ports of the second number of resources with respective receive antenna ports of the terminal device 120. In some embodiments, the terminal device 120 may allocate a power for the associated ports of the second number resources. In some embodiments, the terminal device 120 may equally allocate a power for the RS communication among all ports of each resource. In some embodiments, the terminal device 120 may equally allocate a power for the RS communication among only the associated ports of each resource.

For example, in some embodiments where the terminal device 120 is configured with 4T6R and the first number of resources comprise a first resource and a second resource and each of the first and second resources consists of four ports, the terminal device 120 may cause two predetermined ports of the first resource to be associated with two receive antenna ports of the terminal device 120, and two predetermined ports of the second resource to be associated with the same two receive antenna ports of the terminal device 120, while cause remaining ports of the first and second resources to be associated with four receive antenna ports of the terminal device 120 other than the two receive antenna ports, respectively. In this way, the communication of the RS can be performed on the four ports of each of the first and second resources. In these embodiments, the terminal device 120 may equally allocate a power for the RS communication among all ports of each resource.

In some embodiments where the terminal device 120 is configured with 4T6R and the first number of resources comprise a first resource and a second resource and each of the first and second resources consists of four ports, the terminal device 120 may cause three predetermined ports of the first resource and three predetermined ports of the second resource to be associated with different three receive antenna ports of the terminal device 120, respectively. In this way, the communication of the RS can be performed on the three predetermined ports of each of the first and second resources. In these embodiments, the terminal device 120 may equally allocate a power for the RS communication among the three predetermined ports of each resource.

In some embodiments where the terminal device 120 is configured with 4T6R and the first number of resources comprise a first resource and a second resource, and the first resource consists of four ports and the second resource consists of two ports, the terminal device 120 may cause the four ports of the first resource and the two ports of the second resource to be associated with different antenna ports of the terminal device 120, respectively. In this way, the communication of the RS can be performed on the four ports of the first resource and the two ports of the second resource.

In these embodiments, the terminal device 120 may equally allocate a power for the RS communication among the four ports of the first resource, and equally allocate a portion of the power among the two ports of the second resource. For example, the terminal device 120 may equally allocate half of the power among the two ports of the second resource. Alternatively, the terminal device 120 may equally allocate a power for the RS communication among the four ports of the first resource, and equally allocate the power among the two ports of the second resource.

In some embodiments where the terminal device 120 is configured with 4T6R and the first number of resources comprise a first resource and a second resource, and each of the first and second resources consists of four ports, the terminal device 120 may cause the four ports of the first resource and two predetermined ports of the second resource to be associated with different antenna ports of the terminal device 120, respectively. In this way, the communication of the RS can be performed on the four ports of the first resource and the two predetermined ports of the second resource.

In these embodiments, the terminal device 120 may equally allocate a power for the RS communication among the four ports of each of the first and second resources. Alternatively, the terminal device 120 may equally allocate a power for the RS communication among the four ports of the first resource, and equally allocate the power among the two predetermined ports of the second resource.

Figure 8:
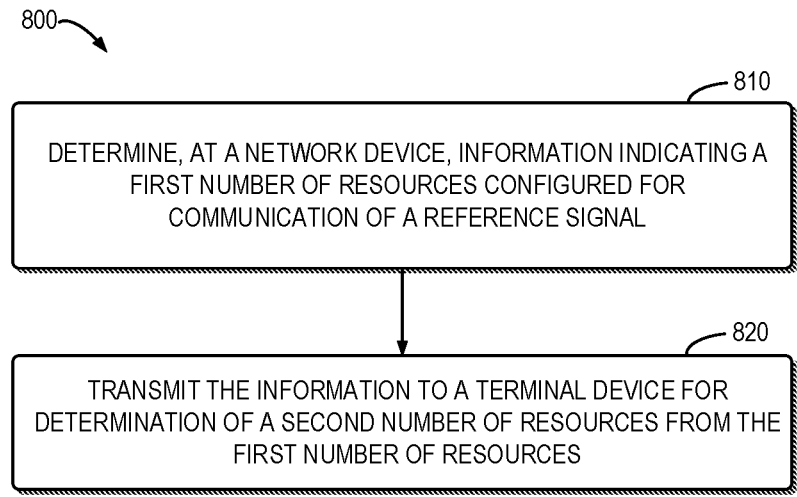
FIG. 8 illustrates an example method of communication implemented at a network device in accordance with some embodiments of the present disclosure.

So far, the method implemented at a terminal device is described. Correspondingly, embodiments of the present disclosure also provide a method implemented at a network device. FIG. 8 illustrates an example method 800 of communication implemented at a network device in accordance with some embodiments of the present disclosure. For example, the method 800 may be performed at the network device 110 as shown in FIG. 1. For the purpose of discussion, in the following, the method 800 will be described with reference to FIG. 1. It is to be understood that the method 800 may include additional blocks not shown and/or may omit some blocks as shown, and the scope of the present disclosure is not limited in this regard.

As shown in FIG. 8, at block 810, the network device 110 determines information indicating a first number of resources configured for communication of a RS, the first number being associated with a third number of transmit antenna ports and a fourth number of receive antenna ports of a terminal device. In some embodiments, the fourth number is larger than a predetermined number. In some embodiments, the predetermined number may be larger than or equal to four. In some embodiments where the fourth number is one of six and eight, the third number may be larger than one.

At block 820, the network device 110 transmits the information to the terminal device 120 for determination of a second number of resources from the first number of resources. The second number of resources is used for performance of the communication of the RS. In some embodiments, the first number is larger than or equal to the second number.

In some embodiments where the third number is four and the fourth number is six (4T6R), the first number of resources may comprise a first resource and a second resource, each of the first and second resources consisting of four ports, and the second number of resources comprise the first and second resources. In these embodiments, two predetermined ports of the first resource are associated with two receive antenna ports of the terminal device 120, and two predetermined ports of the second resource are associated with the same two receive antenna ports of the terminal device 120, while remaining ports of the first and second resources are associated with four receive antenna ports of the terminal device other than the two receive antenna ports, respectively.

In some alternative embodiments, three predetermined ports of the first resource and three predetermined ports of the second resource are associated with different three receive antenna ports of the terminal device 120, respectively. In these embodiments, a power for the communication is equally allocated among the three predetermined ports of the first and second resources.

In some embodiments where the third number is four and the fourth number is six(4T6R), the first number of resources comprise a first resource and a second resource, the first resource consisting of four ports and the second resource consisting of two ports, and the second number of resources comprise the first and second resources. In these embodiments, the four ports of the first resource and the two ports of the second resource may be associated with different antenna ports of the terminal device 120, respectively.

In some embodiments, a power for the communication may be equally allocated among the four ports of the first resource, and a portion of the power may be equally allocated among the two ports of the second resource. For example, half of the power may be equally allocated the two ports of the second resource. In some alternative embodiments, a power for the communication may be equally allocated among the four ports of the first resource, and the power for the communication may be equally allocated among the two ports of the second resource.

In some embodiments where the third number is four and the fourth number is six(4T6R), the first number of resources comprise a first resource and a second resource, each of the first and second resources consisting of four ports, and the second number of resources comprise the first and second resources. In these embodiments, the four ports of the first resource and two predetermined ports of the second resource may be associated with different antenna ports of the terminal device, respectively. In some embodiments, a power for the communication may be equally allocated among the four ports of the first resource, and a portion of the power may be equally allocated among the two predetermined ports of the second resource. In some alternative embodiments, a power for the communication may be equally allocated among the four ports of the first resource, and the power for the communication may be equally allocated among the two predetermined ports of the second resource.

In some embodiments where the third number is one and the fourth number is eight (1T8R), the first number of resources may comprise at least three resource sets, each of the at least three resource sets having up to three resources, and each resource consisting of one port.

In some embodiments where the third number is one and the fourth number is six (1T6R), the first number of resources may comprise at least two resource sets, each of the at least two resource sets having up to three resources, and each resource consisting of one port.

In some embodiments where the third number is two and the fourth number is six (2T6R), the first number of resources may comprise at least one resource set, each of the at least one resource set having up to three resources, and each resource consisting of one port.

The implementations of the methods described in FIGS. 7 and 8 substantially correspond to the processes described in connection with FIG. 2, and thus other details are not repeated here. With the methods 700 and 800 according to embodiments of the present disclosure, a RS resource configuration and RS communication for increased antenna ports can be achieved.

Figure 9:
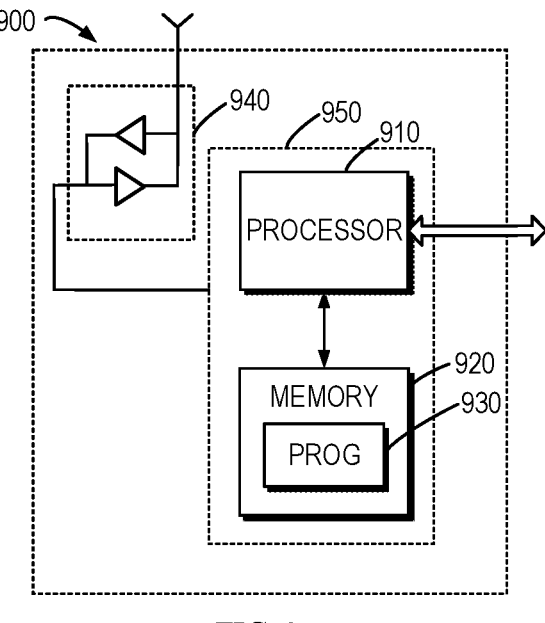
FIG. 9 is a simplified block diagram of a device that is suitable for implementing embodiments of the present disclosure.

FIG. 9 is a simplified block diagram of a device 900 that is suitable for implementing embodiments of the present disclosure. The device 900 can be considered as a further example implementation of the network device 110 or the terminal device 120 as shown in FIG. 1. Accordingly, the device 900 can be implemented at or as at least a part of the network device 110 or the terminal device 120.

As shown, the device 900 includes a processor 910, a memory 920 coupled to the processor 910, a suitable transmitter (TX) and receiver (RX) 940 coupled to the processor 910, and a communication interface coupled to the TX/RX 940. The memory 910 stores at least a part of a program 930. The TX/RX 940 is for bidirectional communications. The TX/RX 940 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 930 is assumed to include program instructions that, when executed by the associated processor 910, enable the device 900 to operate in accordance with the embodiments of the present disclosure, as discussed herein with reference to FIGS. 1 to 8. The embodiments herein may be implemented by computer software executable by the processor 910 of the device 900, or by hardware, or by a combination of software and hardware. The processor 910 may be configured to implement various embodiments of the present disclosure. Furthermore, a combination of the processor 910 and memory 920 may form processing means 950 adapted to implement various embodiments of the present disclosure.

The memory 920 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 920 is shown in the device 900, there may be several physically distinct memory modules in the device 900. The processor 910 may be of any type suitable to the local technical network, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication performed by a terminal device, the method comprising:

receiving, from a network device, configuration information of up to two sounding reference signal (SRS) resource sets configured for antenna switching, wherein the terminal device is configured with xT6R for antenna switching, wherein x is a positive integer, wherein each SRS resource set in the up to two SRS resource sets comprises two SRS resources transmitted in different symbols, wherein each SRS resource consists of four SRS ports with SRS port 1003 disabled, and wherein three SRS ports without port 1003 in each SRS resource are associated with different user equipment (UE) antenna ports; and splitting a linear of a transmit power on an active uplink bandwidth part (UL BWP) of a carrier of a serving cell equally across the three SRS ports without the SRS port 1003 of each SRS resource.

2. The method of claim 1, wherein the up to two SRS resource sets comprise a first SRS resource set and a second SRS resource set, and wherein the first SRS resource set and the second SRS resource set are configured with a different value of resource type.

3. The method of claim 1, wherein each SRS resource set comprises the two SRS resources and at least one SRS resource, the two SRS resources being the first two available SRS resources in each SRS resource set.

4. The method of claim 3, wherein a total number of SRS resources in each SRS resource set is larger than 6/x or is larger than ceil(6/x).

5. A method of communication performed by a network device, the method comprising:

transmitting, to a terminal device, configuration information of up to two sounding reference signal (SRS) resource sets configured for antenna switching, wherein the terminal device is configured with xT6R for antenna switching, wherein x is a positive integer,

wherein each SRS resource set in the up to two SRS resource sets comprises two SRS resources transmitted in different symbols, wherein each SRS resource consists of four SRS ports with SRS port 1003 disabled, and wherein three SRS ports without port 1003 in each SRS resource are associated with different user equipment (UE) antenna ports, and wherein a linear of a transmit power on an active uplink bandwidth part (UL BWP) of a carrier of a serving cell is split equally across the three SRS ports without the SRS port 1003 of each SRS resource.

6. The method of claim 5, wherein the up to two SRS resource sets comprise a first SRS resource set and a second SRS resource set, and wherein the first SRS resource set and the second SRS resource set are configured with a different value of resource type.

7. The method of claim 5, wherein each SRS resource set comprises the two SRS resources and at least one SRS resource, the two SRS resources being the first two available SRS resources in each SRS resource set.

8. The method of claim 7, wherein a total number of SRS resources in each SRS resource set is larger than 6/x or is larger than ceil (6/x).

9. A terminal device, comprising:

a processor configured to cause the terminal device to:

receive, from a network device, configuration information of up to two sounding reference signal (SRS) resource sets configured for antenna switching, wherein the terminal device is configured with xT6R for antenna switching, wherein x is a positive integer, wherein each SRS resource set in the up to two SRS resource sets comprises two SRS resources transmitted in different symbols, wherein each SRS resource consists of four SRS ports with SRS port 1003 disabled, and wherein three SRS ports without port 1003 in each SRS resource are associated with different user equipment (UE) antenna ports; and split a linear of a transmit power on an active uplink bandwidth part (UL BWP) of a carrier of a serving cell equally across the three SRS ports without the SRS port 1003 of each SRS resource.

10. The terminal device of claim 9, wherein the up to two SRS resource sets comprise a first SRS resource set and a second SRS resource set, and wherein the first SRS resource set and the second SRS resource set are configured with a different value of resource type.

11. The terminal device of claim 9, wherein each SRS resource set comprises the two SRS resources and at least one SRS resource, the two SRS resources being the first two available SRS resources in each SRS resource set.

12. The terminal device of claim 11, wherein a total number of SRS resources in each SRS resource set is larger than 6/x or is larger than ceil(6/x).

*     *     *     *     *